United States Patent [19]

Matsunami et al.

[11] Patent Number: 5,802,345
[45] Date of Patent: Sep. 1, 1998

[54] COMPUTER SYSTEM WITH A REDUCED NUMBER OF COMMAND END INTERRUPTS FROM AUXILIARY MEMORY UNIT AND METHOD OF REDUCING THE NUMBER OF COMMAND END INTERRUPTS

[76] Inventors: Naoto Matsunami, Matsuba Hights A-202, Nakada-cho 643-1, Izumi-ku, Yokohama-shi, Kanagawa-ken, Japan; Masayuki Kan, 20350 Stevens Creek Blvd., Apt. #501, Cupertino, Calif. 95014; Yasunori Kaneda, Hitachi, Seciria Nagatadai 320, Nagatadai 9-3, Minami-ku, Yokohama-shi, Kanagawa-ken, Japan; Ikuya Yagisawa, Hitachi Fujimi-ryo 508, Yoshida-cho 1545, Totsuka-ku, Yokohama-shi, Kanagawa-ken, Japan; Takashi Oeda, Dai 2 Yoshihara Hights 15, Shimokurata-cho 1223, Totsuka-ku, Yokohama-shi, Kanagawa-ken, Japan; Hiroshi Arakawa, Hatachi Keimei-ryo 258, Maioka-cho 850, Totsuka-ku, Yokohama-shi, Kanagawa-ken, Japan

[21] Appl. No.: 411,991

[22] Filed: Mar. 28, 1995

[30] Foreign Application Priority Data

Mar. 28, 1994 [JP] Japan ................... 6-057197

[51] Int. Cl.$^6$ ................. G06F 13/00; G06F 13/12
[52] U.S. Cl. ................. 395/500; 395/441; 395/275; 395/733
[58] Field of Search ................ 395/500, 275, 395/441, 826, 733, 825, 827

[56] References Cited

U.S. PATENT DOCUMENTS 5,148,432 9/1992 Gordon et al. .................. 371/10.1
5,179,704 1/1993 Jibbe et al. ....................... 395/725
5,313,588 5/1994 Nagashige et al. ............... 395/275
5,572,699 11/1996 Kamo et al. ...................... 395/441

FOREIGN PATENT DOCUMENTS 60-225957 11/1985 Japan ................. G06F 13/14
4-131954 5/1992 Japan ................. G06F 13/10
5-250099 9/1993 Japan ................. G06F 3/06

Primary Examiner—Kevin J. Teska
Assistant Examiner—Vuthe Siek
Attorney, Agent, or Firm—Antonelli, Terry, Stout, & Kraus, LLP

[57] ABSTRACT

A computer system which includes a host machine having a memory and a CPU with an interrupt handling feature, an auxiliary memory unit for recording and reproducing data and an input/output unit for permitting data input and output between the host machine and the auxiliary memory unit. The CPU of the host machine generates a plurality of commands for designating access to the auxiliary unit, in response to at least one command, groups a plurality of the commands for designating access to the auxiliary memory unit, into at least one group and supplies the input/output unit with the commands independently of one another. The input/output unit executes access to the auxiliary memory unit as designated by each of the commands of one group supplied independently of one another by the CPU, and notifies the CPU by a single interruption that execution of the commands of the one group has been terminated when the accesses designated by all commands belonging to the one group have been terminated.

51 Claims, 12 Drawing Sheets

WRITE CACHE OPERATION AND RELATING OF COMMANDS

COMPUTER SYSTEM WITH A REDUCED NUMBER OF COMMAND END INTERRUPTS FROM AUXILIARY MEMORY UNIT AND METHOD OF REDUCING THE NUMBER OF COMMAND END INTERRUPTS

CROSS REFERENCE TO RELATED APPLICATIONS

This application is related to application Ser. Nos. 08/199,838, filed Feb. 22, 1994 now U.S. Pat. No. 5,651,132 and 08/312,791, filed Sep. 27, 1994, the disclosures of which are incorporated herein by reference.

BACKGROUND OF THE INVENTION

The present invention relates generally to improved techniques for accessing an auxiliary memory unit used by a computer system. More particularly, the present invention relates to a method and apparatus for reducing the number of interruptions to a central processing unit (CPU) included in the computer system during access to the auxiliary memory unit constructed of a plurality of disc drives by the computer system.

There is known multi-disc technology involving a plurality of disc drives connected to a single host computer whereby a reliable, high-speed disc unit is implemented as an auxiliary memory unit of a computer system. Techniques of this type are discussed illustratively in "A Case for Redundant Arrays of Inexpensive Disks (RAID)" in Proc. ACM SIGMOD, June 1988 (published by the University of California, Berkeley). The subject of the publication involves connecting a plurality of disc drives to a CPU via a dedicated controller so that the controller will take care of all kinds of disc management procedures including control over distribution of data to the configured disc drives. This setup allows the CPU to regard the multiple disc drives as a single disc unit.

Since CPU throughput is nearly doubling every year, there has proposed the implementation of so-called soft arrays or soft RAID. This technique involves getting a CPU to control a plurality of disc drives using software, i.e., without the use of a dedicated controller.

The software-based technique allows a disc interface of the CPU to connect a plurality of configured disc drives. In operation, a driver process running on the CPU takes a command issued by another process that treats a plurality of disc drives virtually as a single disc unit, and converts the command into individual commands to be sent to the individual disc drives. In recording data, the driver process generates redundant data for correcting data errors and records the redundant data along with the target data. In reproducing data, the driver process corrects any error in the reproduced data using the redundant data previously recorded for error correction purposes.

As outlined above, the soft array or soft RAID technique helps to implement a reliable, inexpensive and high-performing disc system by taking advantage of the continually increasing CPU power.

However, it takes time to access discs in the disc drives because the access operation involves mechanical movements. To get apparently faster access to discs in the disc drives, the so-called read-cache and write-cache techniques have been used extensively.

These conventional techniques require having a cache area allocated beforehand in a main memory. The read-cache technique involves reading data from a disc drive and storing it in the cache area. If a process issues a request for reading the same data, the data in the cache area of main memory is read and delivered to the process without accessing the disc drive. This scheme reduces the number of disc access operations. The write- cache technique involves writing data to the cache area of main memory and issuing a write end notice to the process that has requested the disc access operation. Upon elapse of a predetermined period of time, the data in the cache area of main memory is written collectively to the disc, whereby the number of disc access operations is also reduced.

The read-cache and write-cache techniques take advantage of the temporally and spatially localized nature of access operations to discs requested by the process. Because of their considerable time-saving effects, these techniques are widely utilized by a majority of computer systems.

Generally, user programs run on the computer system under a principal program called the operating system (OS). The OS allows the programs to operate in parallel. In implementing the parallel operation, the OS manages the programs in units called processes which are switched on a time division basis during execution.

In the generic computer system, the CPU issues a disc access command to a disc unit. When the disc unit terminates the designated access, the unit sends an interruption to the CPU notifying the latter of the end of the access corresponding to the issued command. On receiving the interruption, the CPU halts the ongoing process temporarily and initiates predetermined interrupt handling for disc access termination.

Interrupt handling of the above type proceeds as follows. The CPU first halts the ongoing process, preserves the environment needed to restart the process later, prepares an environment necessary for executing necessary interrupt handling, and executes the interrupt handling process. With the interrupt handling completed, the CPU returns to the environment in effect before execution of the interrupt handling, and restarts the process that was put on hold.

As outlined above, execution of the interrupt handling places heavy burdens on the CPU. However, the above-mentioned soft array or soft RAID technique allows the driver process running on the CPU to convert the issued command into a plurality of commands to be sent to individual disc drives. This means that an interruption by the disc unit to the CPU notifying it of the end of access must occur for each of the multiple commands issued to the individual disc drives.

Where redundant data is generated for error correction to obtain at higher reliability and is stored on discs along with target data, the CPU issues, in addition to the command for access to data requested by the user process, a data read command for generating the redundant data and a data write command for writing the redundant data. This translates into a growing number of interruptions by which the disc unit notifies the CPU of the end of each access.

In other words, the aforementioned soft array or soft RAID technique entails high frequencies of interrupt handling and thereby places a heavy burden on the CPU in executing the interrupt handling. As a result, the user program may not be executed as fast as is desired, or the multi-disc setup may fail to attain the level of performance envisaged.

The write-cache technique requires removing data from the cache area of the main memory at predetermined intervals. Since the capacity of main memory has its limit, when the amount of data yet to be written to the discs has exceeded a predetermined level, the excess data needs to be written out to the disc unit so that the cache area will be available for the next data write operation.

The write operation, performed either periodically or as designated, involves writing a large amount of data at a time to the disc unit. In carrying out the operation, the CPU needs to issue many write commands for the necessary processing in addition to the command for access to the data requested by the user process. This increases the number of interruptions by which the disc unit notifies the CPU of the end of each access.

As described, the write-cache technique also entails high frequencies of interrupt handling and places a heavy burden on the CPU in executing the interrupt handling.

SUMMARY OF THE INVENTION

It is therefore an object of the present invention to provide a computer system that reduces the number of interruptions to the CPU at times of disc access, whereby the operative burdens on the CPU are alleviated.

In achieving the foregoing and other objects of the present invention and according to one aspect thereof, there is provided a computer system including a host machine having a memory and a CPU with an interrupt handling feature, an auxiliary memory unit for recording and reproducing data to and from an auxiliary recording medium, and an input/output unit for permitting data input and output between the auxiliary memory unit and the host machine.

The CPU of the host machine includes means for generating a plurality of commands for designating access to the auxiliary unit, relation means, responsive to at least one command, for grouping a plurality of commands for designating the access to the auxiliary memory unit into at least one group, and for supplying the input/output unit with the commands independently of one another.

The input/output unit includes access execution means for executing the access to the auxiliary memory unit as designated by each of the commands issued independently by the CPU, and notification means for notifying the CPU by a single interruption that the processing of a particular group has been terminated when the accesses designated by all commands belonging to the particular group have been terminated.

Alternatively, the above input/output unit may be replaced by one including access execution means for executing access to the auxiliary memory unit as designated by each of the commands issued independently by the CPU, and notification means for notifying the CPU by a single interruption that processing of a particular group has been terminated when the accesses designated by all commands belonging to the particular group have been terminated based on information in the memory which represents correspondence between each of the groups and the commands belonging to the groups.

With the computer system according to the invention, the CPU, instead of being notified of the end of each of the individual commands, is notified by a single interruption of the end of the processing of a particular group of commands only when the accesses designated by all commands belonging to that particular group have been terminated. This scheme reduces the number of interruptions to the CPU and therefore alleviates the operative loads on the CPU.

BRIEF DESCRIPTION OF THE DRAWINGS

The present invention will be more apparent from the following detailed description, when taken in conjunction with the accompanying drawings, in which.

DETAILED DESCRIPTION OF THE PREFERRED EMBODIMENTS

Preferred embodiments of the invention will now be described with reference to the accompanying drawings.

Figure 1:
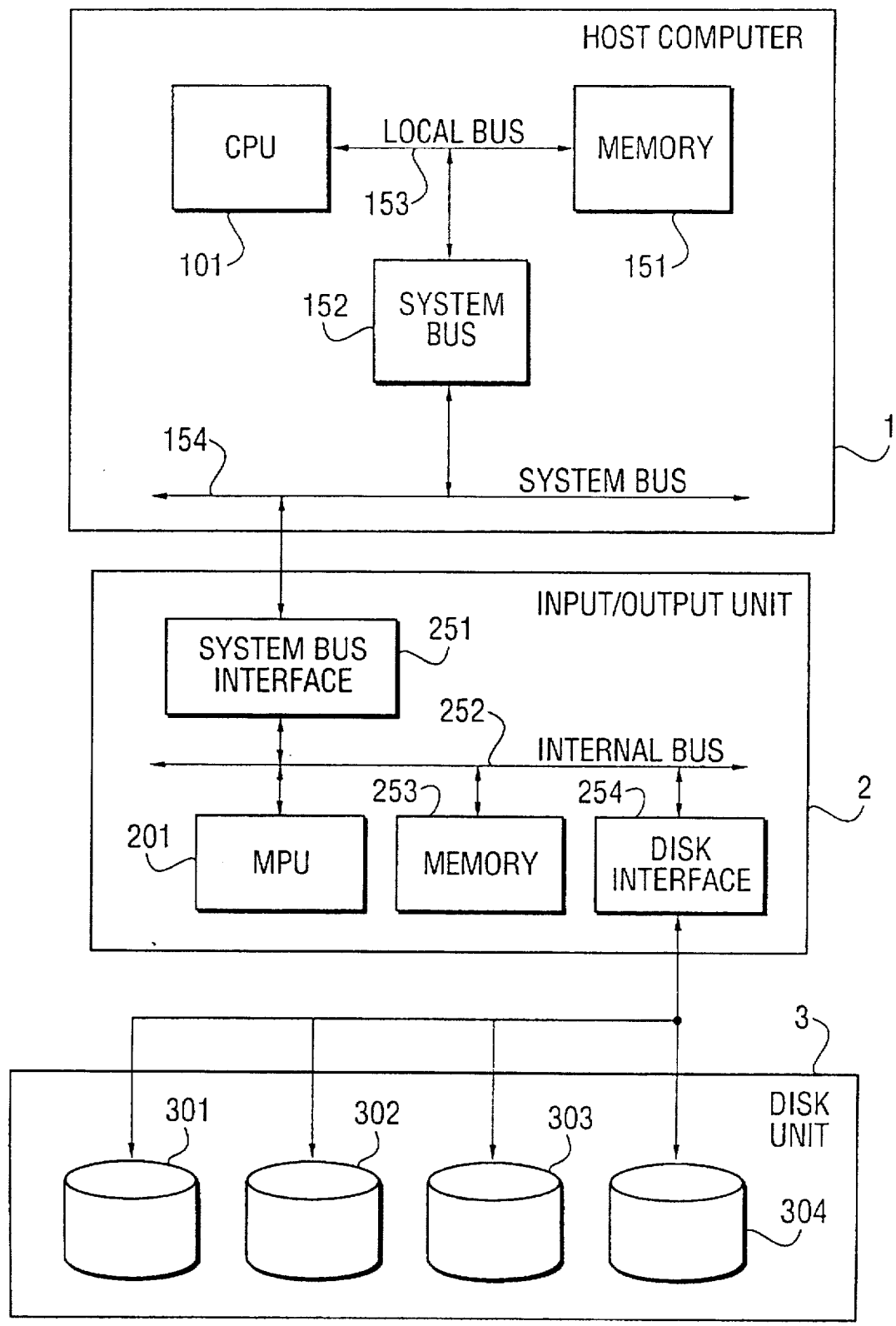
FIG. 1 is a block diagram of a computer system practiced as an embodiment of the invention.

FIG. 1 is a block diagram of a computer system practiced as a first embodiment of the invention.

In FIG. 1, reference numeral 1 is a host computer; 101 is a CPU that provides overall control on the host computer 1 and executes various calculations; 151 is a memory that stores data and programs to be executed by the CPU 101; 153 is a local bus of the CPU 101; 154 is a system bus that connects peripheral devices; and 152 is a system bus interface that connects the local bus 153 and system bus 154 so as to connect peripheral circuits to the CPU 101.

Reference numeral 2 is an input/output unit that controls data input and output to and from disc drives connected to the system bus 154 of the host computer 1. An MPU 201 provides overall control on the input/output unit 2 and carries out various calculations. A system bus interface 251 connects to the system bus 154 of the host computer 1. Reference numeral 252 is an internal bus of the input/output unit 2; 253 is a memory that stores programs to be executed by the MPU and other necessary data; and 254 is a disc interface that connects the disc drives.

Reference numeral 3 is a disc unit that comprises disc arrays made of a plurality of hard disc drives (301–304).

Alternatively, the disc unit 3 may be a single or a plurality of discrete disc drives. The disc unit 3 of the first embodiment is composed illustratively of a single or a plurality of discrete disc drives.

The flow of data in a disc access operation of the CPU 101 takes place as follows:

In the host computer 1, it becomes necessary over time for the CPU 101 to read data from the disc unit 3. In that case, the CPU 101 issues a read command via the system bus interface 152 to the input/output unit 2. In the input/output unit 2, the MPU 201 receives the read command via the system bus interface 251, analyzes the command, converts it into commands (i.e., disc commands) destined to the target disc drives of the disc unit 3, and issues the commands to the disc unit 3 via the disc interface 254. Upon receipt of the disc commands, the disc unit 3 positions the heads accordingly and transfers the target data to the input/output unit 2. The input/output unit 2 receives the data via the disc interface 254 and transfers the received data to the memory 151 of the host computer 1 via the system bus 154 and system bus interface 152 of the host. The data transfer occurs in one of two ways. Namely, either the CPU 101 of the host computer 1 reads the data directly from the system bus interface 251 of the input/output unit 2 and transfers the data to the memory 151, or the input/output unit 2 transfers on its own the data to the memory 151 of the host computer 1. With the first embodiment, the latter way of data transfer (I/O unit 2 transferring data to memory 151) is implemented.

The processing described above completes the data read operation from the disc unit 3. Using the retrieved data, the CPU 101 of the host computer 1 performs necessary computations. For a data write operation, only the direction of data transfer is reversed. The other aspects of the data write operation are the same as those of the data read operation.

Figure 2:
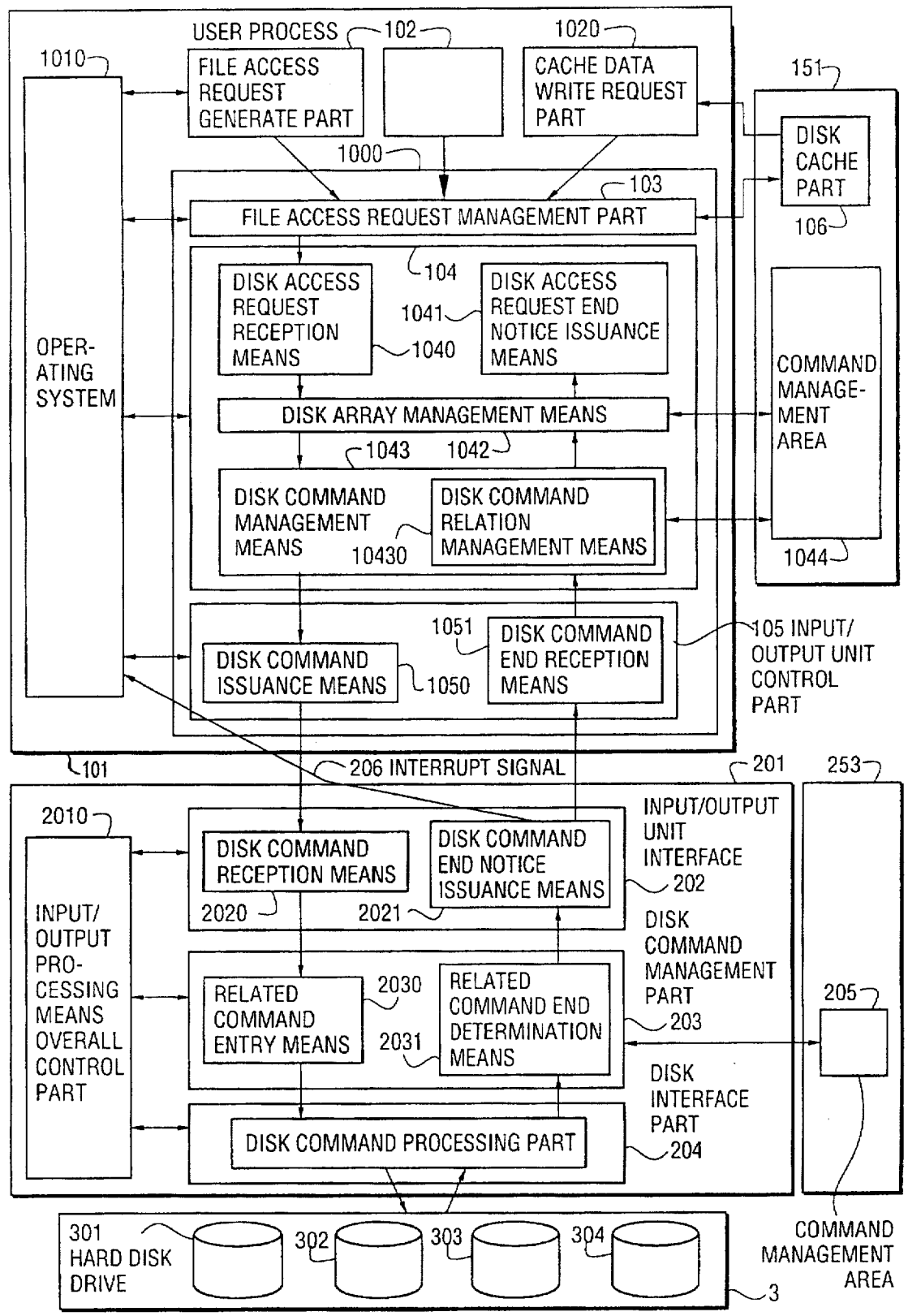
FIG. 2 is a block diagram of the constitution of the components associated with disc access command processing in the embodiment illustrated in FIG. 1.

FIG. 2 is a block diagram of the structure of the CPU 101 in the host computer and that of the MPU 201 in the input/output unit 2, emphasizing the components for implementing the disc access command processing of the CPU 101.

In FIG. 2, reference numeral 1010 is the operating system (OS) that runs on the CPU 101; 102 is a user process that generates and issues a request for access to a file stored on discs; 1020 is a cache data write request part; and 1000 is a disc driver part.

In practice, the user process 102, the cache data write request part 1020 and the disc driver part 1000 are implemented as processes that are executed by the CPU 101 under control of the operating system 1010 which in turn runs on the CPU 101.

Although the CPU 101 and the MPU 201 are shown to be directly connected in FIG. 2, the connection is in fact accomplished via the system bus interfaces 152 and 251. And although the MPU 201 and the disc unit 3 are also shown to be directly connected, that connection is achieved in practice by way of the disc interface 254.

In the disc driver part 1000, reference numeral 103 represents a file access request management part that relates files to data storage addresses on the discs, takes a file access request generated and issued by the cache data write request part 1020 and converts the request into a request for access to actual disc drives. A disc command management part 104 receives the disc access request issued by the file access request management part 103, accordingly, and generates commands to individual disc drives in the disc unit 3. The disc command management part 104 also performs other operations including command relation processing, command issuance, and termination of command processing, to be described later. An input/output unit control part 105 supplies the input/output unit 2 with disc commands generated by the disc command management part 104. A disc cache part 106 is a cache area allocated in the memory 151.

In the disc command management part 104, reference numeral 1040 stands for disc access request reception means for receiving the disc access request issued by the file access request management part 103. Disc access request end notice issuance means 1041 issues an end-of-request notice to the file access request management part 103 regarding the terminated disc access request. Disc array management means 1042 takes an access request made to a disc unit 3 illustratively composed of disc arrays, and converts the request into access requests to the individual disc drives involved. Disc command management means 1043 incorporates disc command relation management means 10430 for managing the disc unit 3 and for relating disc commands to one another, as will be described later.

A command management area 1044 is allocated in the memory 151. This area includes a related command management table (to be described later in detail) for managing information about command groups related by the disc command relation management means 10430.

In the MPU 201, reference numeral 2010 is an overall control part that corresponds to the OS. An input/output unit interface 202 receives the disc command issued by the input/output unit control part 105 of the host computer 1, notifies the overall control part 2010 of the received disc command and, when execution of the command is terminated, notifies the host computer 1 of the end of the disc command. A disc command management part 203 manages entry and termination of the received command from the input/output unit control part 105, and also manages entry and termination of commands that are related to one another. In accordance with the received disc command, a disc command processing part 204 gains access to the appropriate disc drives so as to execute data transfer between the disc unit 3 and the memory 151 in the host computer 1. In practice, the input/output unit interface 202, the disc command management part 203, and the disc command processing part 204 are processes that are executed under control of the overall control part 2010 which in turn is a program running on the MPU 201.

A command management area 205 is allocated in the memory 253. This area includes a related command management table, to be described later.

In the disc command management part 203, reference numeral 2030 represents related command entry means for taking the commands related to one another by the disc command management means 1043 in the host computer 1 and for entering these related commands into the command management area 205 of the memory 253 in the input/output unit 2. Related command end determination means 2031 checks to see if all disc accesses corresponding to the related commands thus entered have been terminated.

A disc access operation of the first embodiment takes places as follows:

Referring to FIG. 2, it becomes necessary over time for the ongoing user process 102 to write or read data to or from discs. In that case, the user process 102 issues a file access request to the OS 1010. In response, the OS starts the disc driver part 1000 and delivers the file access request thereto.

In the disc driver part 1000, the file access request management part 103 references a file storage information table furnished inside and, according to the file access request received, acquires from the table the disc to be accessed in the disc unit 3, the file transfer start address on the disc, and the length of the data to be transferred to the disc unit 3. The file access request management part 103 converts the file access request into a disc access request that includes the acquired information regarding the file access.

The disc access request reception means 1040 in the disc command management part 104 receives the disc access request, and generates a disc command packet accordingly in the memory 151.

Figure 3:
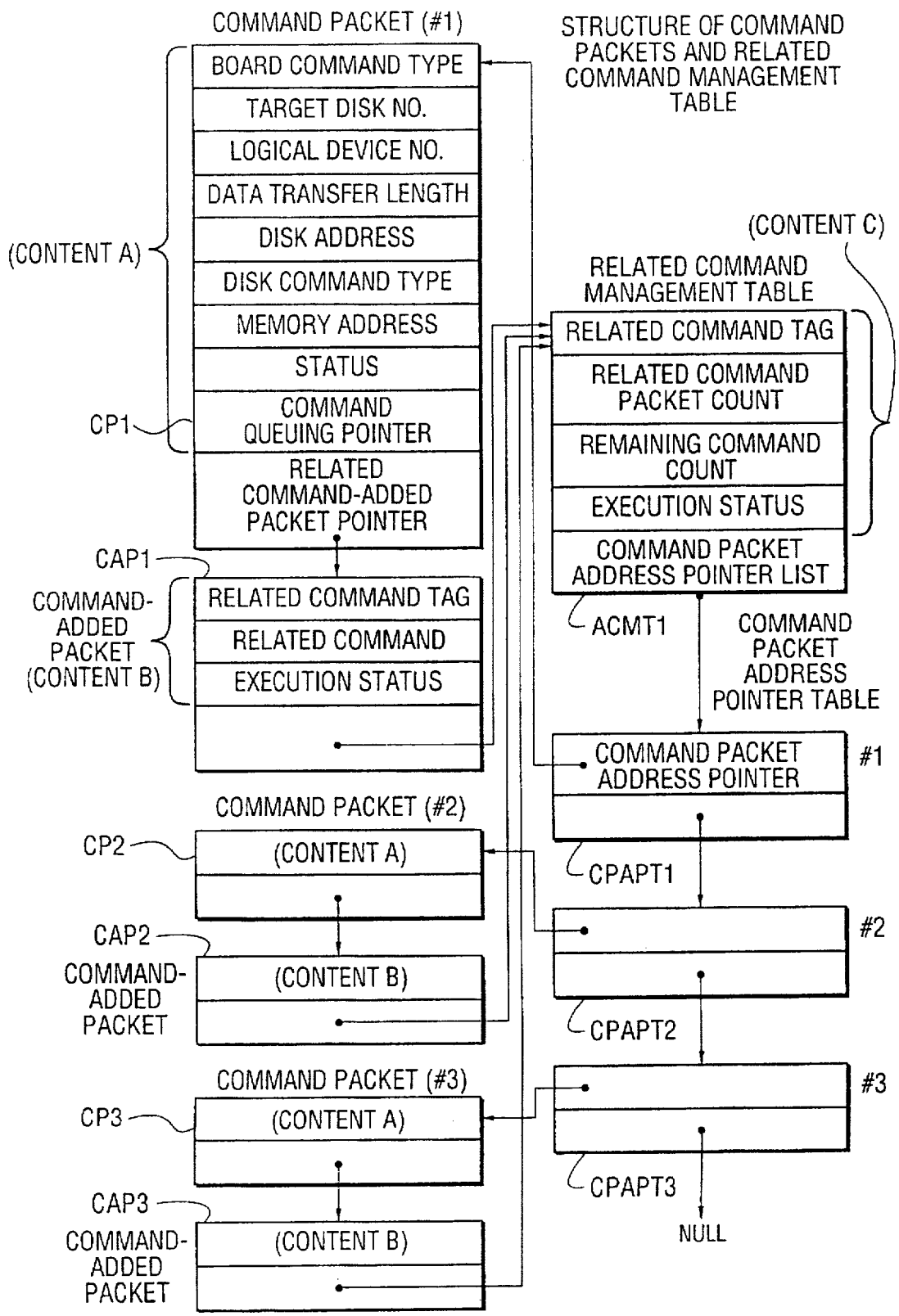
FIG. 3 is a view showing typical structures of command packets and a related command management table, and the relationship between the command packets, as well as the management table in connection with the embodiment illustrated in FIG. 1.

The format of the disc command packet is illustrated in FIG. 3. A command packet CP includes fields representing: (1) type of command to be sent to the input/output unit (board) in use; (2) target disc number; (3) logical device number of the target disc (partition number, logical unit number, etc.); (4) data transfer length; (5) disc address of the target data; (6) disc command type (read/write); (7) memory address of the data destination (or source); (8) execution status information of the command packet; (9) command queuing pointer used in queue management when a plurality of command packets are queued in the host computer or input/output unit (fields (1) through (9) constitute content A); and (10) command-added packet management pointer needed to manage related commands.

The disc access request reception means 1040 allocates a command packet area in the memory 151. The command packet area has fields into which the disc access request reception means 1040 enters such information as: (1) type of the command destined to the input/output unit (board) in use; (2) target disc number; (3) logical device number of the target disc (partition number, logical unit number, etc.); (4) data transfer length; (5) disc address of the target data; (6) disc command type (read/write); and (7) memory address of the data destination (or source). After entering the information into the command packet area, the disc access request reception means 1040 supplies the disc array management means 1042 with the address of the command packet in the memory 151.

Since the first embodiment is assumed to have its disc unit 3 made up of discrete disc drives, the disc array management means 1042 simply hands the received command packet address over to the disc command management means 1043 without reacting otherwise thereto. How the disc command management means 1043 works with the disc unit 3 practiced as a disc array unit will be described later in connection with a second embodiment of the invention.

Figure 4:
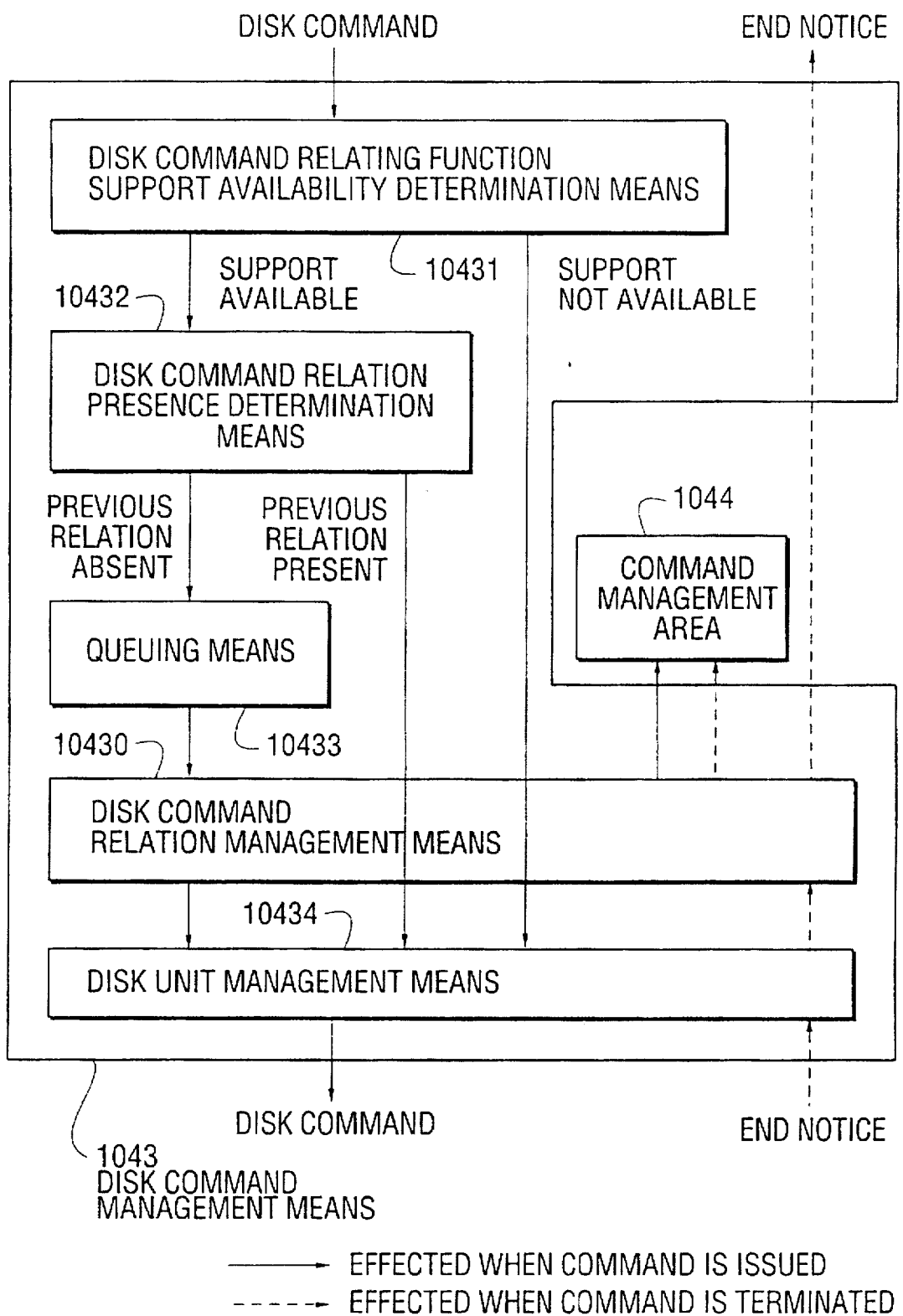
FIG. 4 is a block diagram of the disc command management means in the embodiment illustrated in FIG. 1.

FIG. 4 shows the construction of the disc command management means 1043 for receiving command packet addresses.

In FIG. 4, reference numeral 10431 represents disc command relating function support availability determination means for checking to see if a disc command relating function is supported by the input/output unit 2 connected to the host computer 1. Disc command relation presence determination means 10432 checks to see if a given disc command packet is already related. Queuing means 10433 queues command packet addresses. Disc unit management means 10434 manages disc resources. The disc command relation management means 10430 mentioned earlier relates disc commands and performs termination processing on the related commands that have been terminated.

In the above construction, the disc command management means 1043 receives a command packet address. With the command packet address received, the disc command relating function support availability determination means 10431 references the command packet of the received address, and checks to see if the relating function, to be described later, is supported by the input/output unit connected to the disc drive designated by the command packet. To implement this determination requires entering beforehand into the disc command management part 104 information about each input/output unit 2 connected to the host computer 1.

Suppose that the determination by the means 10431 above has revealed that the received command packet is one to be sent to the disc drive not supporting the relating function. In that case, the address of the command packet is sent directly to the disc unit management means 10434. If the destination disc drive is found to support the relating function, the address of the command packet is forwarded to the disc command relation presence determination means 10432.

The disc command relation presence determination means 10432 checks to see if the disc command packet of the received address has already been related. This determination is carried out because a disc command packet may have been related by the disc array management means 1042 that is configured upward, as will be described later in connection with the second embodiment. If the disc command packet is found to have been related, there is no need to relate that packet again. In that case, the disc command relation presence determination means 10432 sends the address of the command packet to the disc unit management means 10434.

If the command packet has yet to be related, the disc command relation presence determination means 10432 sends the address of the command packet to the queuing means 10433. The queuing means 10433 places incoming command packets consecutively into a queue provided in the memory 151. At this point, the information about the entry of the command packet address is forwarded to the disc command relation management means 10430.

This completes the processing by the disc driver part 1000 of a single file access request. Another process is then executed on the CPU 101.

The disc driver part 1000 is also started periodically, at appropriate intervals as designated by timer interruptions under control of the OS 1010 or by start instructions from a disc command management process 102' running under the OS 1010. When started by a timer interruption, the disc driver part 1000 executes the processing to be described below. Where the disc driver part 1000 has yet to be started periodically, the processing may also be carried out immediately after the number of the queued command packet addresses has reached a predetermined count according to the information sent from the queuing means 10433.

When the disc driver part 1000 is started by a timer interruption, the disc command relation management means 10430 scans in the memory 151 a plurality of command packets whose addresses have been queued. In so doing, the disc command relation management means 10430 selects a group of command packets that are relatable to one another. The criterion by which to determine relatable command packets may be set as desired. A number of examples in this respect will be offered in connection with the subsequent embodiments of the invention, to be described later.

If a number of relatable command packets have been detected, the disc command relation management means 10430 retrieves the addresses of these command packets consecutively from the queuing means 10433. These command packets are then related to one another.

How the relating of the command packets is performed will now be described in more detail.

FIG. 3 shows illustratively three command packets CP1, CP2 and CP3, selected as relatable command packets. In the description that follows, the selected command packets are called the related command packets, and the set of the selected command packets is called the related command packet group.

The disc command relation management means 10430 first creates in the memory 151 command-added packets corresponding to the related command packets. The address of a command-added packet is set to a related command-added packet pointer in each command packet, whereby the command-added packet is linked to the command packet.

Each command-added packet includes fields representing: (1) identification number specific to the related command packet group (related command tag); (2) number of command packets in the related command packet group; (3) execution status information on the related command packet (fields (1) through (3) constitute content B); and (4) pointer to the corresponding related command management table.

The disc command relation management means 10430 creates in the memory 151 a related command management table 1044 with respect to a single related command packet group. The related command management table 1044 includes fields representing: (1) identification number specific to the related command packet group (related command tag); (2) total number of command packets in the related command packet group; (3) number of unfinished command packets in the related command packet group; (4) execution status information on the related command packet group (fields (1) through (4) constitute content C); and (5) link pointer for managing a command packet address pointer table, to be described later.

The disc command relation management means 10430 creates the command packet address pointer table for each command packet. This table comprises fields representing: (1) address pointer to the command packet, and (2) pointer to the next command packet address pointer table.

As described, the command packets and the related command management table are constructed so that they may be referenced one from the other via a command-added packet and a command packet address pointer table.

After the disc command relation management means 10430 has extracted relatable command packets in the manner described, these command packets are entered into the related command management table in the command management area 1044 of the memory.

The disc command relation management means 10430 then issues the address of the command packet to the disc unit management means 10434.

Upon receipt of the command packet address, the disc unit management means 10434 checks to see if the command packet of the received address is linked to a command-added packet. If the command-added packet is found to have been linked, the disc unit management means 10434 issues the command packet together with the command-added packet to the input/output unit control part 105.

The input/output unit control part 105 receives the command packet and forwards it to the input/output unit 2. Specifically, the command packet is written to a command register in the system bus interface 251 of the input/output unit 2.

With the above processing terminated, the disc driver part 1000 ends its operation. Another process is then executed on the CPU 101.

With the command packet written to the command register of the system bus interface 251 in the input/output unit 2, disc command reception means 2020 of the input/output unit interface 202 then writes the packet to the memory 253. That address in the memory 253 to which the disc command was written is sent to the disc command management part 203.

After the disc command management means 203 has received the address, the related command entry means 2030 checks to see if the command packet of the received address is one of the related command packets. The check is performed by use of the linked command-added packet.

If the relation is detected, the disc command management means 203 references the related command table in the command management area 205 of the memory 253. In so doing, the disc command management means 203 checks to see if there exists a related command management table having the same related command tag as that of the command-added packet. If such a related command management table is found to exist, the address of that table is set to the related command management table address field of the command-added packet. Then a command packet address pointer table corresponding to the command packet is created and linked to the related command management table. If a related command management table having the same related command tag as that of the command-added packet does not exist, a new related command management table is created and the address of that table is set to the related command management table address field of the command-added packet. Then a command packet address pointer table corresponding to the command packet is created and linked to the related command management table. At the time of a new address entry, the number of related command packets in the command-added packet is set to the number of related command packets as well as to the number of remaining commands in the related command management table.

In the manner described, the disc command management part 203 builds in the memory 253 information equivalent to the information created in the memory 151 (in FIG. 3).

Thereafter, using the management table in the memory 253 for the disc drive targeted by the command packet, the disc command management part 203 determines the working status of that disc drive. If the target disc drive is occupied, the disc command management part 203 places the address of the command packet into the command queue in the memory 253 and waits for the disc drive to be freed. If the target disc drive is found to be free, the disc command management part 203 sets, in the management table of the target disc drive, information indicating that the target disc drive is free. The address of the command packet is set in the same management table. The address of the command packet is also delivered to the disc command processing part 204.

In accordance with the command packet of the delivered address, the disc command processing part 204 gains access to the appropriate disc drive and transfers the retrieved data between the disc and the memory 151 of the host computer 1. At the end of the transfer, the disc command processing part 204 sends an end-of-transfer notice to the disc command management part 203.

The related command end determination means 2031 of the disc command management part 203 detects the command packet corresponding to the received end-of-transfer notice by referencing the above-mentioned management table. A check is then made to see if the detected command packet is a related command packet. If the command packet is found to be a related command packet, the disc command management part 203 references the related command management table as per the "related command management table address" field in the command-added packet linked to the command packet. The remaining command count in the field is decremented by 1. If the remaining command count is not zero (>0) after the decrement operation, that means the processing of all related command packets belonging to the same related command packet group has not been terminated. In that case, the value of the "execution status" field in the command- added packet is set for "command end being awaited" and the disc command management part 203 waits while doing nothing. If the remaining command count is zero after the decrement operation, that means the processing of all related command packets belonging to the same related command packet group has been terminated. Then the disc command management part 203 reads the "related command tag" field and "execution status" field of the related command packet group terminated from the related command management table, and notifies the input/output unit interface 202 thereof. Given the notice, disc command end notice issuance means 2021 of the input/output unit interface 202 sends to the CPU 101 an interrupt signal 206 notifying the host computer 1 of the end of the processing regarding the related command packet group.

The interrupt signal 206 is transmitted to the OS 1010 via the interrupt handling feature, a hardware part of the CPU 101. At this point, the OS 1010 halts the ongoing process temporarily, stores the status information (context) such as the contents of registers inside the CPU 1, and starts the disc driver part 1066.

Disc command end reception means 1051 of the disc driver part 1000, started by the interrupt signal 206, acquires the related command tag and the execution status of the related command packet group from the input/output unit interface 202 of the input/output unit 2 in order to verify that the related command packet group has been normally terminated. With the normal termination of the related command packet group ascertained, the disc command end reception means 1051 outputs the acquired related command tag and execution status to the disc command management means 1043.

When the disc command management means 1043 (see FIG. 4) of the disc driver part 1000 in the CPU 101 receives the terminated related command tag, the disc command relation management means 10430 references the related command management table 1044 on the basis of the related command tag, whereby the terminated related command packet is subjected to suitable end processing. An end notice of each of the commands belonging to the related command packet group is issued to the source of the file access request via the disc array management means 1042, disc access request end notice issuance means 1041 and file access request management unit 103. At the same time, the related command management table 1044 corresponding to the related command tag is erased. This completes all processing on the CPU side regarding the related command packet group in question.

Meanwhile, the input/output unit interface 202 of the input/output unit 2 that delivered the execution status of the related command group to the CPU 101 returns the related command tag to the disc command management part 203. In response, the disc command management part 203 deletes the related command management table 205 having the related command tag returned, the related command packet command address pointer table linked to the table 205, and the related command packet having the related command tag returned, along with the linked command-added packet. This completes all processing on the input/output unit side regarding the related command group in question.

Figure 5:
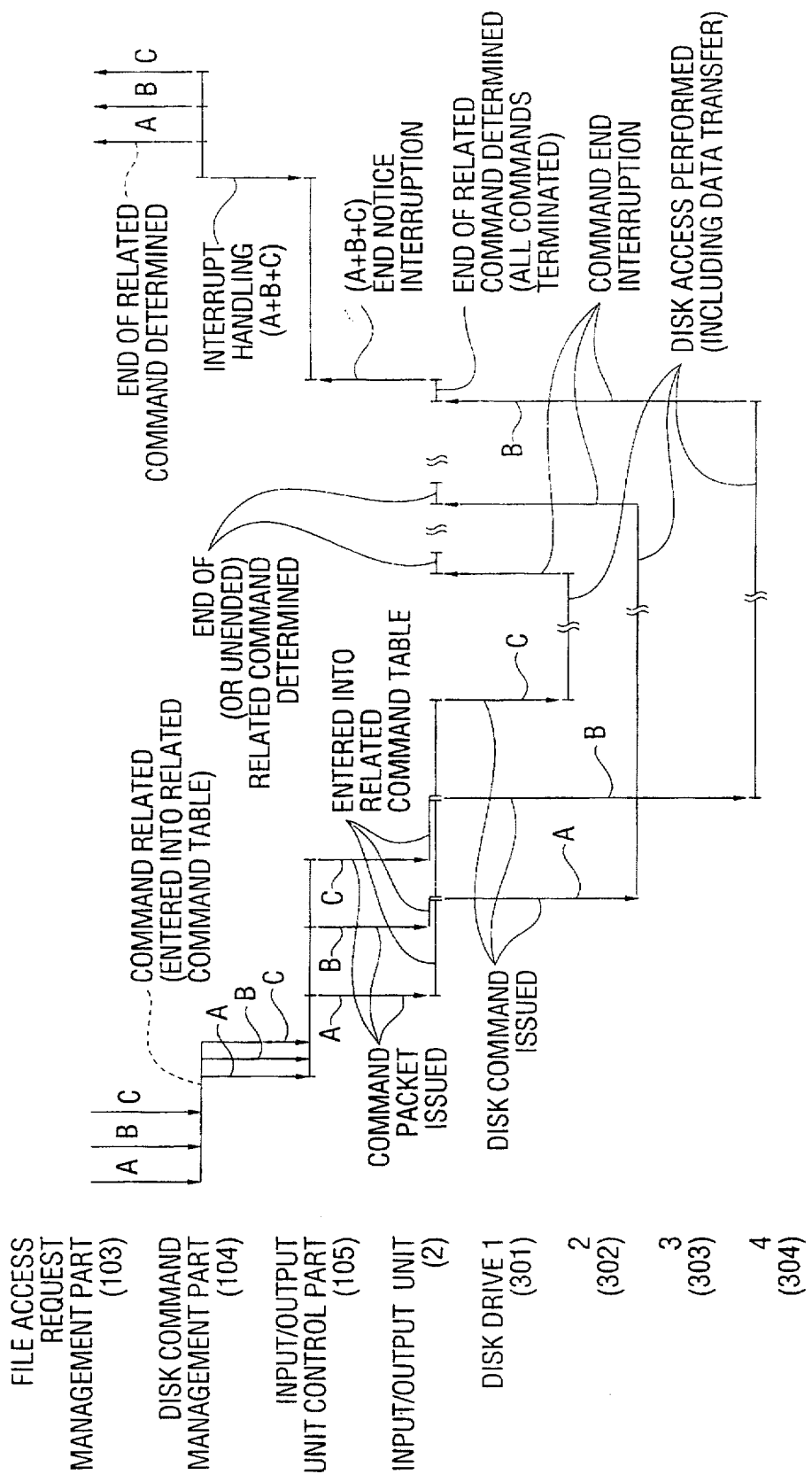
FIG. 5 is a timing chart depicting the disc access operation of the embodiment illustrated in FIG. 1.

How the first embodiment of the invention works has been described above. FIG. 5 is a timing chart illustrating the sequence in which commands are carried out and their notices are made. In FIG. 5, the axis of abscissa represents the passage of time, and arrows in the direction of the axis of ordinate stand for the commands handed over from one part to another.

As illustrated, a plurality of disc commands are managed as a single related command group while the CPU 101 and the input/output unit 2 operate in cooperation. The scheme substitutes a single end notice for n end notices issued conventionally by the input/output unit to the host computer regarding n disc commands.

Every time an end notice is to be made, the input/output unit first issues an interrupt signal to the host computer. The CPU receives the interrupt signal and halts the ongoing program (process) to execute interrupt handling. In the conventional setup, the CPU 101 must deal with the heavy loads of the interrupt routine and process switch executed generally to switch processes on the CPU 101.

By contrast, the first embodiment of the invention drastically reduces the incidence of interrupt handling and thus appreciably lowers the load factor on the CPU.

In the above description provided in connection with the first embodiment, the input/output unit 2 receives the command packet together with the command-added packet from the host computer 1, and accordingly creates the related command management table and command packet address pointer table in the memory 253 of the input/output unit 2. Alternatively, the input/output unit 2 may receive only the address of the command packet from the host computer 1. Based on this address, the subsequent processing may involve direct access to the command packet, command-added packet, related command management table, and command packet address pointer table in the memory 151 of the host computer 1. That is, instead of storing in the memory 253 the command packet together with the command-added packet, related command management table, and command packet address pointer table for later use, a variation of the first embodiment may directly utilize the command packet, command-added packet, related command management table and command packet address pointer table in the memory 151 of the host computer 1.

What follows is a description of the second embodiment of the invention.

The second embodiment provides that the disc unit 3, also used in the first embodiment, has a disc array structure.

The disc array structure includes a plurality of disc drives which, accommodating data in a distributed manner, must be viewed virtually as a single disc drive from the user process. The processing needed to let the user process regard the multiple disc drives virtually as one disc drive is carried out by the CPU 101 of the host computer 1. It follows that the input/output unit 2 issuing commands to the disc drives has nothing to do with management over data distribution throughout the disc array.

The construction of the computer system practiced as the second embodiment of the invention is the same as that of the first embodiment depicted in FIGS. 1, 2 and 4.

Figure 6:
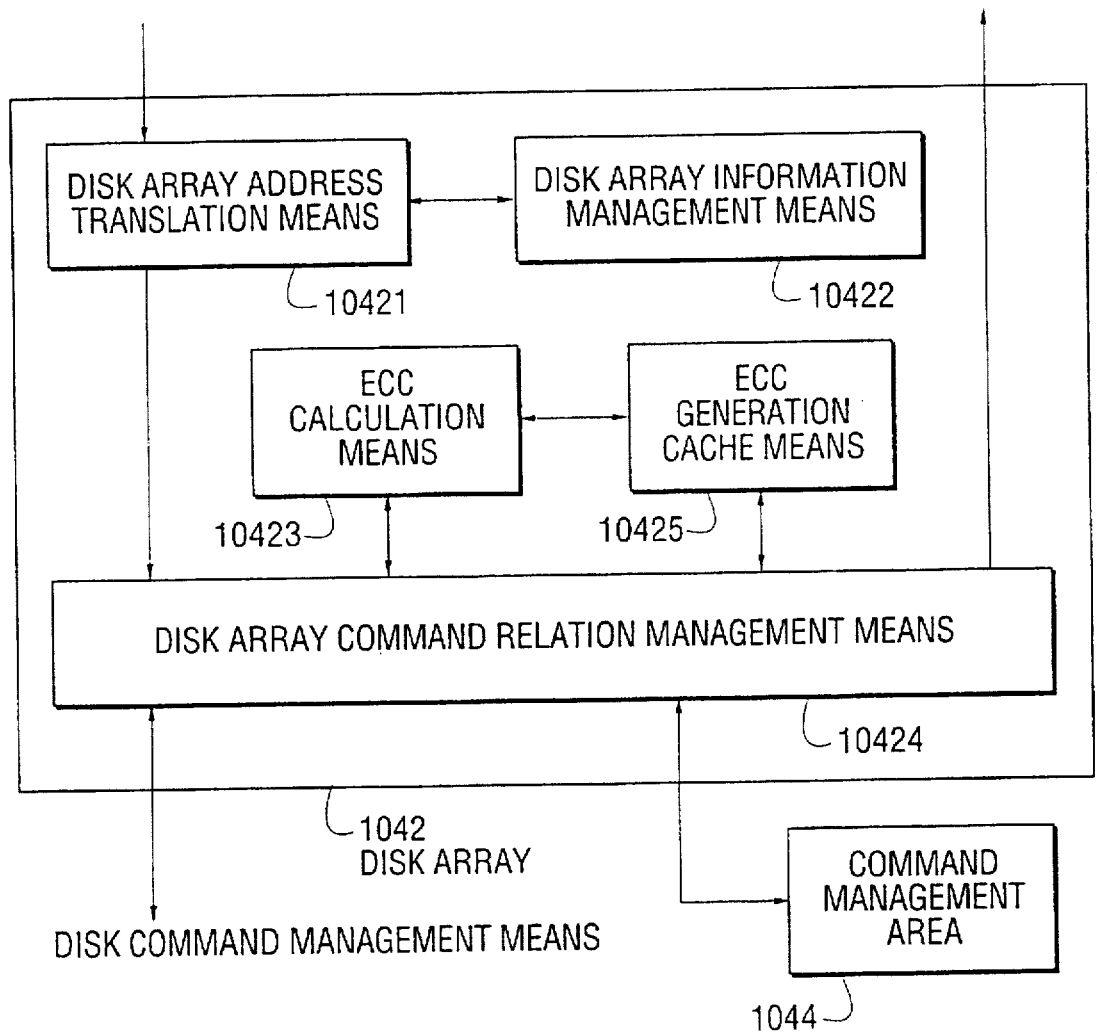
FIG. 6 is a block diagram of the disc array management means in the embodiment illustrated in FIG. 1.

FIG. 6 is a block diagram showing the construction of the disc array management means 1042 (see FIG. 2) that was not discussed in connection with the first embodiment.

In FIG. 6, reference numeral 10421 is disc array address translation means for carrying out address translation for distributing data to n disc drives; 10422 is disc array information management means for storing and managing information about the disc array structure; 10423 is ECC (error correction code) calculation means for generating ECCs so that any one disc drive having failed in the disc array will not lead to data loss; 10424 is disc array command relation management means for relating disc array command groups; and 10425 is ECC generation cache means for holding data needed to make ECC generation faster.

The second embodiment of the invention works as follows:

It should be noted that the second embodiment does not use the ECC calculation means 10423 and ECC generation cache means 10425. The setup for using the ECC calculation means 10423 will be described later as a third embodiment, and the setup for using the ECC generation cache means 10425, as a fifth embodiment.

The disc access request reception means 1040 receives a file access request from the user process 102 or from the disc cache management part 106, and accordingly generates a parent command packet regarding the disc access request for the whole disc array. The parent command packet is stored into the memory 151 and the storage address is handed over to the disc array management means 1042.

The disc array address translation means 10421 (see FIG. 6) of the disc array management means 1042 receives the parent command packet and, referencing the constitution information in the disc array information management means 10422, generates a group of child command packets for the individual disc drives. The child command packet group is stored in the memory 151.

Figure 7:
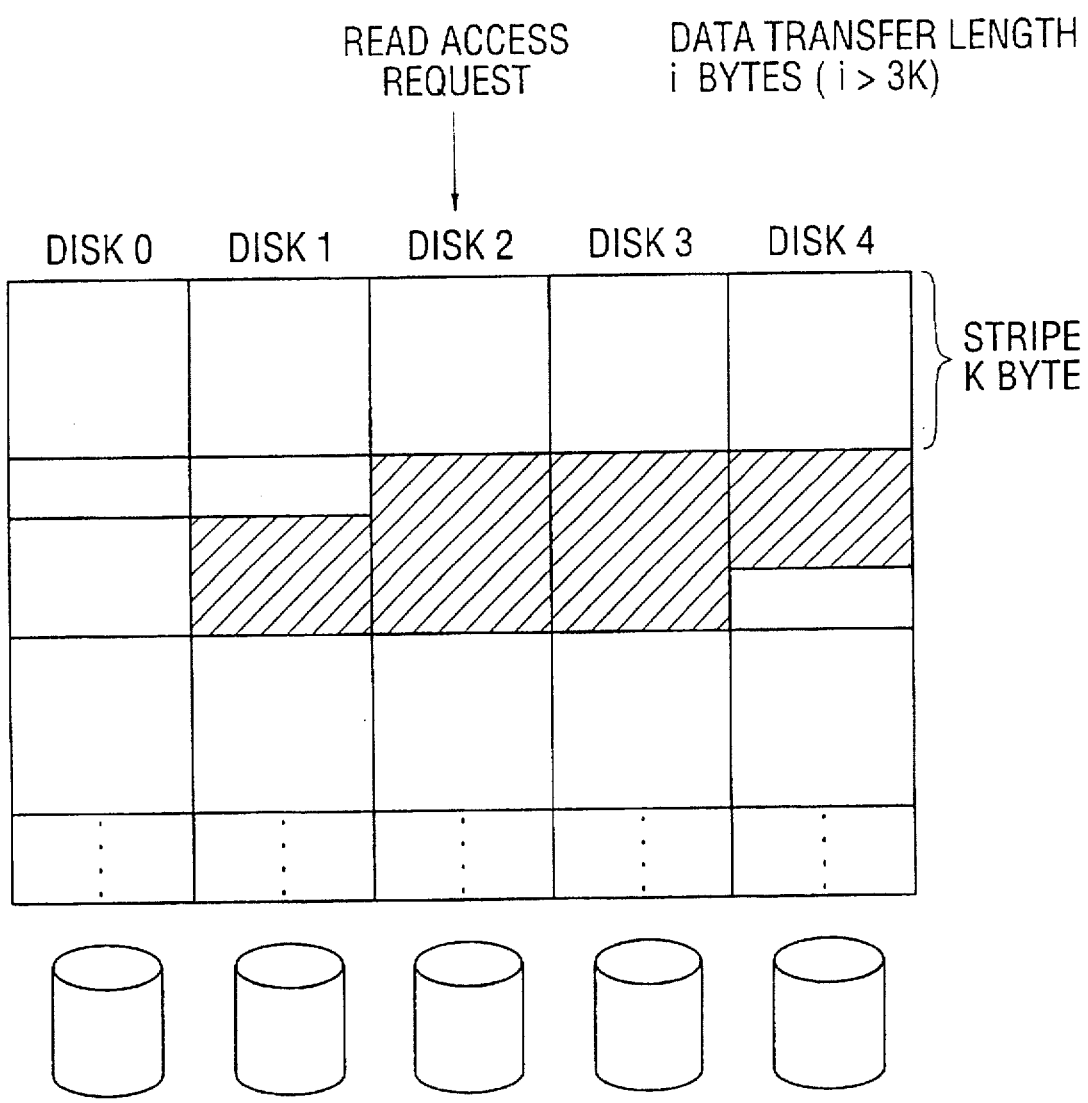
FIG. 7 is a view illustrating how a plurality of discs in a disc array are related to an access request.

Illustratively, suppose that a parent command packet representing one read access request to the whole disc array is issued. In that case, a check is made to see if the following condition is met:

$$4k > i > 3k$$

where, i stands for the number of bytes of the data transfer length and k for the number of bytes constituting the unit of data distribution (stripe size) in the disc array, as shown in FIG. 7. If the above condition is found to be met, that means the requested data has been distributed throughout four disc drives. The disc access request reception means 1040 then generates four child command packets destined to the four disc drives (1–4).

Where a group of child command packets is generated, the parent and child command packets are each provided with fields representing: (1) packet type indicating the packet layer; (2) number of divided commands; (3) pointer to the child command packet; (4) pointer to the next command packet in the same layer as the current packet; and (5) pointer to the parent command packet. These fields help to manage command packets in a hierarchical manner.

After the disc array address translation means 10421 has generated the group of child command packets and stored them in the memory 151, their addresses are sent to the disc array command relation management means 10424.

Figure 9:
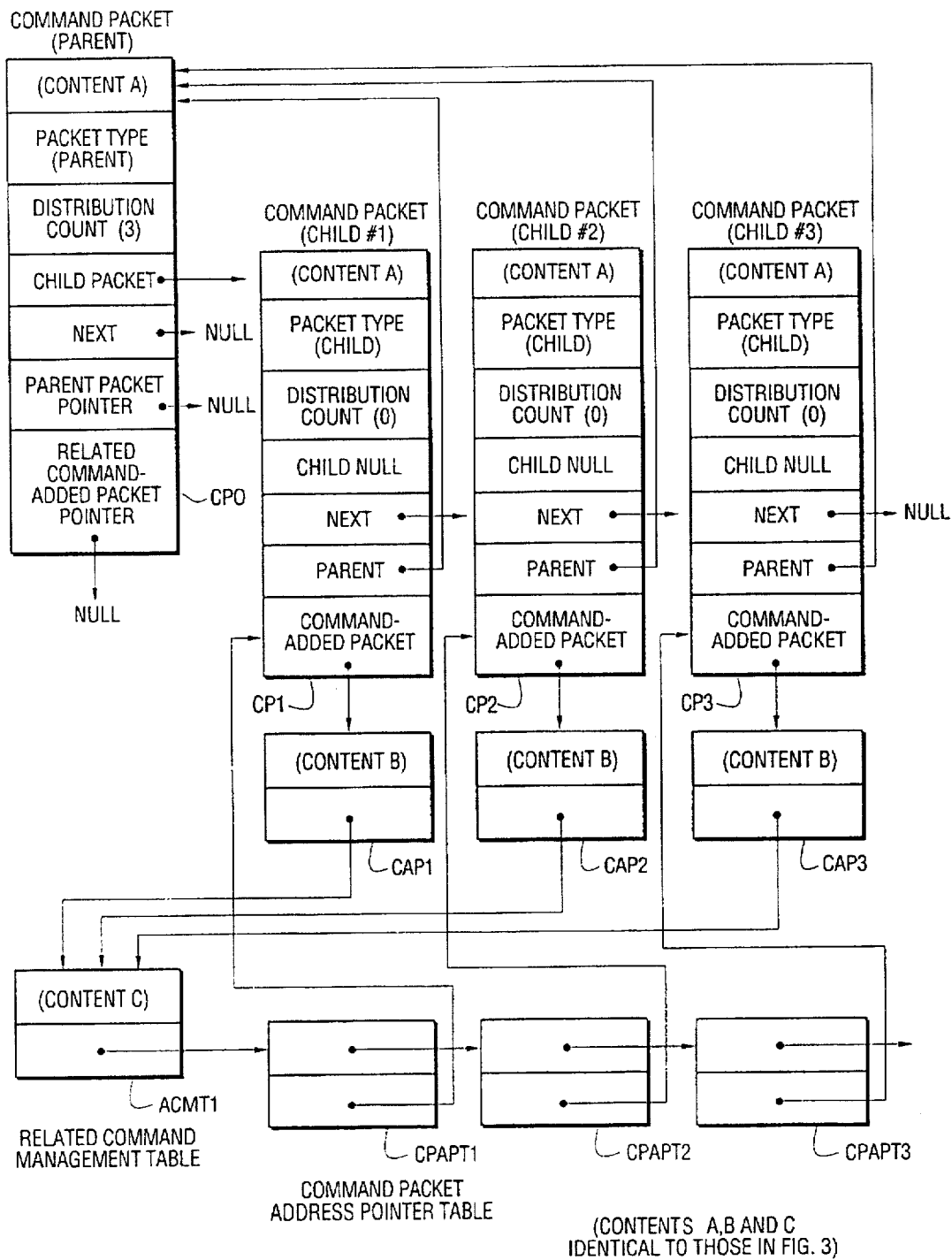
FIG. 9 is a view showing typical structures of command packets and a related command management table, and the relationship between the command packets, as well as the management table in connection with another embodiment of the invention.

The disc array command relation management means 10424 receives the addresses of the child command packets constituting the group, and relates these child command packets. The relating of the packets is carried out in the same manner as is accomplished by the disc command relation management means 10430 discussed in connection with the first embodiment. Specifically, command-added packets, the related command management table 1044 and command packet address pointer tables are created as shown in FIG. 9. In other words, the child command packets become equivalent to related command packets used by the first embodiment.

Thereafter, the disc array management means 1042 hands over the address of each child command packet to the disc command management means 1043.

The disc command management means 1042 receives the address of each of the child command packets which have already been related. Thus these packets are not related again by the disc unit management means 10434 as described in connection with the first embodiment. Instead, the related child command packets whose addresses were handed over to the disc unit management means 10434 are each furnished with a linked command-added packet. The supplemented child command packets are sent by the input/output unit control part 105 to the input/output unit 2.

The subsequent workings of the input/output unit 2 and disc unit 3 are the same as those discussed in connection with the first embodiment. The input/output unit 2 and disc unit 3 operate without becoming aware of parent command packets.

The disc command management means 1043 receives an end notice regarding the related command packet group from the input/output unit 2 in the same manner as with the first embodiment. At this point, the disc command management means 1043 receives the related command tag that was terminated. The disc command relation management means 10430 detects the terminated related command packet by use of the related command tag and checks to see if there exists a pointer to the parent command packet. If that pointer is found to exist, the disc command relation management means 10430 sends the end notice and the related command tag to the disc array command relation management means 10424 in the disc array management means 1042. Using the related command tag, the disc array command relation management means 10424 detects the related command packet terminated. The disc array command relation management means 10424 then deletes from the memory 151 the child command packets, command-added packets, related command management table, and command packet address pointer table which are linked successively to the parent command packet pointed to by the pointer to the parent command packet. At the same time, the disc array command relation management means 10424 sets normal end status to the "execution status" field of the parent command packet, and sends the end notice to the file access request management part 103 via the disc access request end issuance means 1041.

As described, the second embodiment utilizing the disc array structure renders the load factor on the CPU as low as that for the conventional discrete disc setup. The load on the CPU resulting from access to disc arrays is known to be significantly higher than that from access to the discrete disc structure.

A third embodiment of the invention is a variation of the second embodiment wherein the disc array structure includes disc arrays having the ECC function, or RAID (redundant arrays of inexpensive discs). In other words, the third embodiment is a variation of the first embodiment wherein the disc unit 3 is of RAID constitution.

In the technical field involving RAID, ECC data is generally known as parity data. The latter name will be used throughout the description that follows.

Figure 8:
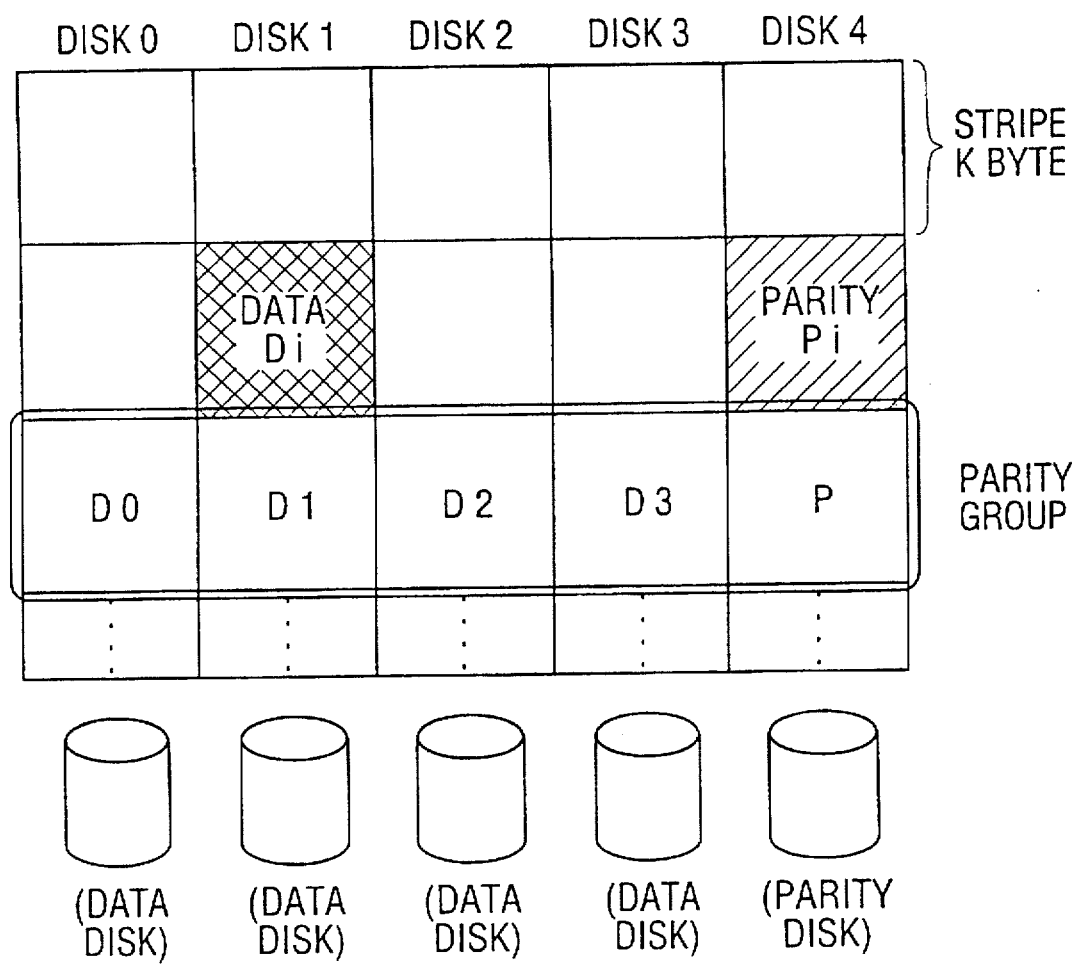
FIG. 8 is a view showing how data and parity data are related in a RAID constitution.

FIG. 8 depicts a typical constitution of the disc unit 3 for use with the third embodiment.

The example of FIG. 8 is a RAID constitution involving five discs. Of the five discs, one is called a parity disc that is dedicated to ECC data. Data D0, D1, D2 and D3 from discs 0 through 3 are exclusive-OR'ed. The resulting parity data P is stored on the disc 4. That is, what takes place here is $$P = D0 + D1 + D2 + D3$$

where, symbol "+" represents an exclusive-OR operation in this specification.

The description that follows includes the term "parity group." This term refers to a group of stripe data which is a set of the same disc address locations common to the discs 0 through 4.

In this RAID structure, a change in data Di of the disc 1 requires modifying the corresponding parity data Pi. The new parity data Pi is calculated as follows: Before new data Di(new) is to be written, data Di(old) written previously on the discs and the corresponding parity data P(old) are read out. These data are subjected to the following operation to generate new parity data P(new):

$$P(new) = D(new) + D(old) + P(old).$$

A single write request to one disc in the disc arrays entails additional disc accesses for updating parity data. In the RAID constitution, a total of four disc accesses need to be carried out as shown above.

That is, compared with the single disc setup, the conventional RAID constitution would quadruple the load on the CPU 101 to deal with interrupt handling.

Below is a description of how the third embodiment of the invention works.

The construction of the computer system practiced as the third embodiment of the invention is the same as that of the second embodiment.

With the third embodiment, the disc array address translation means 10421 (see FIG. 6) of the disc array management means 1042 (see FIG. 2) receives the address of a command packet requesting a write operation of data Di to the disc arrays. In that case, the disc array address translation means 10421 references first the command packet and then the constitution information in the disc array information management means 10422. In so doing, the disc array address translation means 10421 judges the number of discs, the location of the parity disc, and the stripe size involved, thereby determining that the location to which to write the data requested by the write command packet is Di on the disc 1.

Likewise, the disc on which to store the parity data and the disc location to which to write that data are determined.

After this, the disc array address translation means 10421 creates four command packets regarding a read and a write request to the data Di on the disc 1 as well as a read and a write request to the parity data Pi on the disc 4 (see FIG. 8). The four command packets are written to the memory 151. At this point, the disc array address translation means 10421 allocates in the memory 151 an area in which to load the old data and old parity data, and an area in which to create and store the new parity data. The addresses of these memory areas are entered into the respective command packets.

The disc array address translation means 10421 then hands the addresses of these command packets over to the disc array command relation management means 10424.

The disc array command relation management means 10424 relates the received command packet group. The relating of the packets is performed as follows:

The command packets for reading the old data and old parity data are related by creating in the memory 151 command-added packets, a related command management table 1044 and a command packet address pointer table in the same manner as with the second embodiment. Since the new parity data cannot be generated unless both the old data and the old parity data have been read, the disc array command relation management means 10424 need only receive an end notice from the input/output unit 2 upon completion of the two read operations.

The command packets for writing the newly generated parity data and the new data are related also by creating in the memory 151 command-added packets, a related command management table 1044 and a command packet address pointer table in the same manner as with the second embodiment. Since an end notice regarding the write access request need only be made to the upward-configured file access request means 103 after the two write operations have been terminated, the disc array command relation management means 10424 need only receive an end notice from the input/output unit 2 upon completion of the two write operations.

Figure 10:
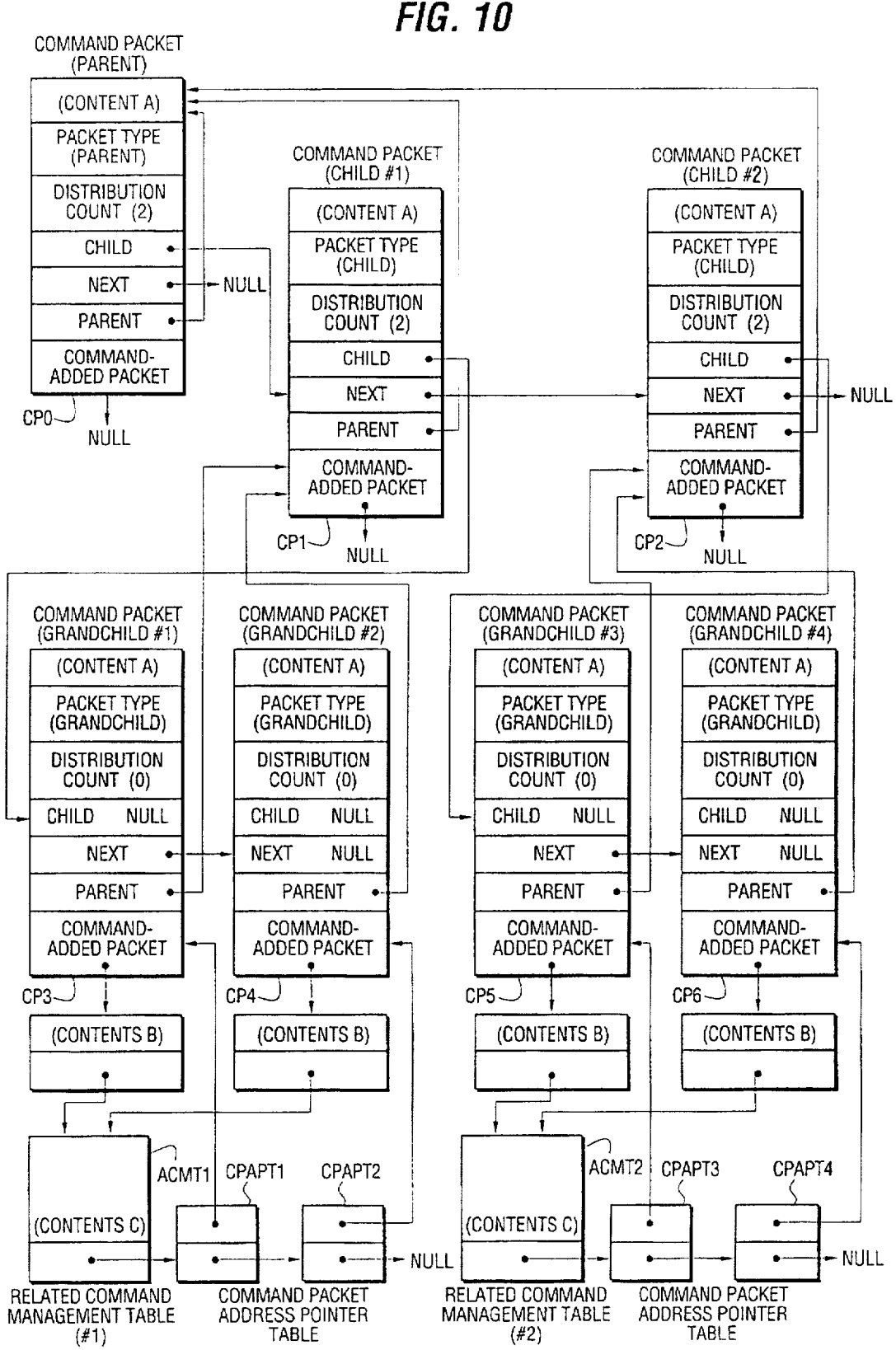
FIG. 10 is a view depicting typical structures of command packets and a related command management table, and the relationship between the command packets, as well as the management table in connection with the another embodiment of the invention.

The third embodiment relates the command packet corresponding to the disc access request from the file access request means 103, to the two read command packets and two write command packets created on the basis of that command packet. The relating is accomplished as follows:

As shown in FIG. 10, another layer is added to the layer structure of the second embodiment. That is, a three-layer structure is used by the third embodiment for command packet management.

The first layer (for parent command packet) corresponds to the disc access request from the file access request means 103. The second layer (for child command packets) is provided where the command packet of the first layer is a write command packet. A child read command packet for the read operation and a child write command packet for the write operation are created. As illustrated, the two packets are linked to the parent command packet.

The third layer (for grandchild command packets) represents individual disc commands to be processed by the input/output unit 2. Two grandchild read command packets (old data read command packet, old parity data read command packet) are linked to the child read command packet, and two grandchild write command packets (new data write command packet, new parity data write command packet) are linked to the child write command packet.

When the relating is done as described, the disc array command relation management means 10424 first supplies the disc command management means 1043 with the two grandchild command packets linked to the child read command packet.

The disc command management means 1043 locks all disc areas belonging to the stripe to which to write data if the first-layer parent command packet linked to the received command packet is a write command packet. Until the lock is released, the disc command management means 1043 thus permits processing of only the grandchild command packets linked to the first-layer parent command packet which in turn is linked to the received command packet (the scheme is intended to lock disc resources). This measure is taken because it is mandatory to perform consecutively, upon read operation, the reading of old (parity) data and the writing of new (parity) data.

Thereafter, the disc command management means 1043 links command-added packets to these grandchild command packets and delivers them altogether to disc command issuance means 1050. In turn, the disc command issuance means 1050 forwards the command packets to the input/output unit 2.

The input/output unit 2 processes the two read command packets in the same manner as with the first embodiment. With the two read command packets finished, the input/output unit 2 issues a termination interruption to the OS 1010 of the host computer 1. The disc command end reception means 1051, started by the interruption in the same manner as with the first embodiment, acquires the related command tag from the input/output unit 2 regarding the finished related command. The related command tag thus acquired is handed over to the disc command management means 1043. The disc command management means 1043 in turn delivers the related command tag to the disc array management means 1042 in the same manner as with the second embodiment.

Using the received related command tag, the disc array command relation management means 10424 of the disc array management means 1042 finds the finished child packet. After verifying the end of the processing of the child read command packet, the disc array command relation management means 10424 sets a normal end to the "execution status" field of the child read command packet and passes control to the ECC calculation means 10423.

In response, the ECC calculation means 10423 acquires three addresses: a memory address at which the new data is stored, acquired from the grandchild write command packet linked to the finished child read command packet via the parent command packet and child write command packet; another memory address at which the old data is stored; and yet another memory address at which the old parity data is stored, acquired from the two grandchild read command packets linked to the finished child read command packet.

The three addresses are read from the memory 151 and exclusive-OR'ed. The result of the exclusive-OR operation is set to the address described in the grandchild command packet for writing the new parity data.

Thereafter, the ECC calculation means 10423 passes control again to the disc array management means 1042. With the new parity data generated, the disc array management means 1042 supplies the disc command management means 1043 with the addresses of the two grandchild write command packets linked to the child write command packet.

In turn, the disc command management means 1043 causes the disc command issuance means 1050 to issue two grandchild write command packets to the input/output unit 2.

The input/output unit 2 processes the two write command packets in the same manner as in the first embodiment. With the processing of the two command packets terminated, the input/output unit 2 issues a termination interruption to the OS 1010 of the host computer 1. The disc command end reception means 1051, started by the interruption in the same manner as with the first embodiment, acquires the related command tag from the input/output unit 2 regarding the finished related command. The related command tag thus acquired is handed over to the disc array management means 1042.

The disc command management means 1043 forwards the related command tag to the disc array management means 1042 in the same manner as in the second embodiment. If the grandchild write command packet corresponding to the related command tag received is found to be linked to the first-layer parent command packet requesting the write operation, the disc command management means 1043 releases the lock on the parent command packet.

Meanwhile, using received related command tag, the disc array command relation management means 10424 of the disc array management means 1042 detects the child packet whose processing is terminated. After verifying the end of the processing of the child read packet, the disc array command relation management means 10424 sets a normal end to the "execution status" field of the child write command packet. The disc array command relation management means 10424 then verifies a normal end in the "execution status" field of the child read command packet linked to the parent command packet which in turn is linked to the child write command packet, and sets normal end status to the "execution status" field of the parent command packet. Thereafter, the disc array command relation management means 10424 causes the disc access request end issuance means 1041 to issue an end notice to the file access request management means 103, and deletes all child command packets, grandchild command packets, command-added packets, related command management table, and command packet address pointer table.

Meanwhile, the file access request management means 103 verifies the normal end status of the parent command packet. The file access request management means 103 then issues a normal end notice to the source of the file access request and deletes the parent command packet from the memory 151.

As described above, where the disc unit is of RAID constitution, the third embodiment relates a plurality of disc accesses upon write operation so as to prevent the burdens of interrupt handling on the CPU from growing.

A fourth embodiment of the embodiment will now be described.

The fourth embodiment is a variation of the first embodiment wherein the disc cache part 106 is utilized.

The structure of the computer system practiced as the fourth embodiment of the invention is the same as that of the first embodiment.

With the fourth embodiment, the file access request management part 103 holds in the disc cache part 106 the data read previously from discs. If the user process 102 issues a read request for the same data, the file access request management part 103 reads the data from the cache area in main memory and gives it to the source of the request (i.e., user process) without accessing any discs. For a write operation, the file access request management part 103 writes data to the disc cache part 106 and issues an end notice to the user process 102, i.e., the source of the write request. The file access request management part 106 includes a management table for managing the cache use status.

Upon the elapse of a predetermined period of time, the data written to the disc cache part 106 in response to write requests from the user process need to be written collectively to the disc unit 3.

How data is written from the disc cache part 106 to the disc unit 3 will now be described.

Figure 11:
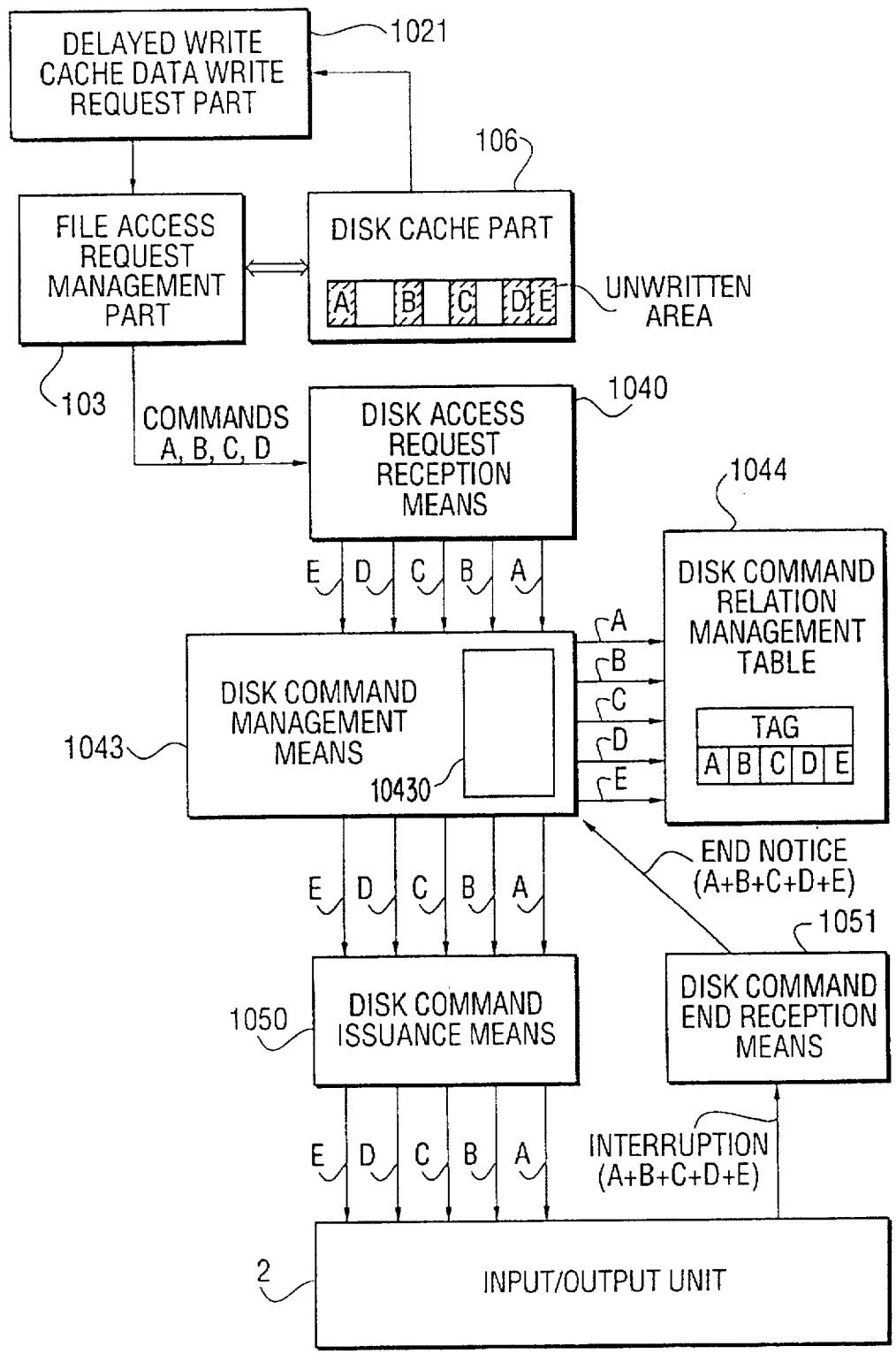
FIG. 11 is a view illustrating how disc access commands are routed by the another embodiment of the invention.

Suppose that, as shown in FIG. 11, data blocks A, B, C, D and E yet to be written to discs are held in the disc cache part 106 of the memory 151 (these blocks are called dirty blocks). In this example, the dirty blocks are written at appropriate intervals to the discs. There exists a number of ways to determine the timing with which to write the data to the discs. The fourth embodiment employs a scheme whereby the cache part is checked periodically for any dirty blocks which, if detected, are written to the discs at that time.

Periodically, a delayed write cache data write request part 1020 issues a dirty cache write instruction to the file access request management part 103. Upon receipt of the dirty cache write instruction, the file access request management part 103 operates on the management table for managing the use status of the disc cache part 106 to detect dirty blocks.

The file access request management part 103 creates disc write access requests regarding the detected dirty blocks and delivers the requests successively to the disc command management part 104.

On receiving the disc access requests, the disc access request means 1040 creates the corresponding command packets, writes them to the memory 151, and sends their addresses to the disc command management means 1043. The disc command management means 1043, on its part, reads the command packets corresponding to the received addresses. As with the first embodiment, the disc command relating function support availability determination means 10431 checks the input/output unit 2 for the availability of the function. The disc command relation presence determination means 10432 checks to see if the command packets have yet to be related. If the command packets are found yet to be related, their addresses are placed into the queuing means 10433. Because the writing of dirty blocks entails creating a large number of command packets at a time, numerous command packet addresses are accommodated in the queuing means 10433.

The disc command relation management means 10430 checks the queuing means 10433 to relate any one of three kinds of command packets: all write command packets whose addresses are present; a limited number of write command packets; or command packets extracted one per disc where a plurality of discs are connected to the input/output unit 2.

With a host computer having a disc cache part wherein a write cache operation is performed, the user's write request is terminated when data is written to the disc cache part 106. In that case, few problems result from any slight delay caused by the relating process in terminating the write operation of each dirty block. Thus there is no difficulty in relating the many write command packets as described above. However, it might be desired on rare occasions that a write operation be performed immediately for such reasons as cache data overflow. In such cases, the command packets may each be furnished with a field for halting the relating as designated by the file access request management part 103. These command packets are not subject to the relating process.

The subsequent workings of the fourth embodiment are the same as those of the first embodiment.

The fourth embodiment may be used in combination with the second or third embodiment. Specifically, the disc array management means 1042 of the second or third embodiment may act to relate a plurality of grandchild read command packets or grandchild write command packets linked to a plurality of parent command packets.

As described, the fourth embodiment reduces the burdens on the CPU in the host computer 1 having the write cache arrangement.

A fifth embodiment of the invention will now be described.

The fifth embodiment is a variation of the third embodiment wherein the ECC (parity) generation cache means 10425 of the disc array management means 1042 is utilized.

When new parity data is generated in the third embodiment, all necessary data (old data, old parity data) are first read from the discs; new parity data is then calculated and sent to the parity disc at the same time that the new data is output to its destination disc. This means that one write operation always occupies two disc drives.

By contrast, the fifth embodiment occupies only one disc drive at a time so as to enhance the efficiency of parallel operation.

Specifically, old data is read and new data is written. The exclusive OR of the old and new data is calculated, the difference data therebetween is generated, and both results are stored in the memory 151. Upon the elapse of an appropriate delay time, the old parity data is read and exclusive-OR'ed with the difference data, whereby new parity data is created and written.

For performance of higher speeds, the fifth embodiment does not read old data every time it is needed; the old data, once read, is held in a predetermined area of the memory 151 under control of the ECC generation cache means 10425. This offers a possibility that the old data in the cache area may be utilized as needed. In such a case, there is no need to read the old data again. Likewise, the old parity data need not be read every time it is required; the old parity data, once read, is held in a predetermined area of the memory 151 also under control of the ECC generation cache means 10425. This offers a possibility that the old parity data in the cache area may be utilized as needed. The cache area may also accommodate new data and new parity data to be written to discs. This makes it possible that the new data and new parity data in the cache area can later be used as old data and old parity data.

Alternatively, the holding of data and parity data may also be accomplished by use of the disc cache part 106 discussed in connection with the fourth embodiment.

Figure 12:
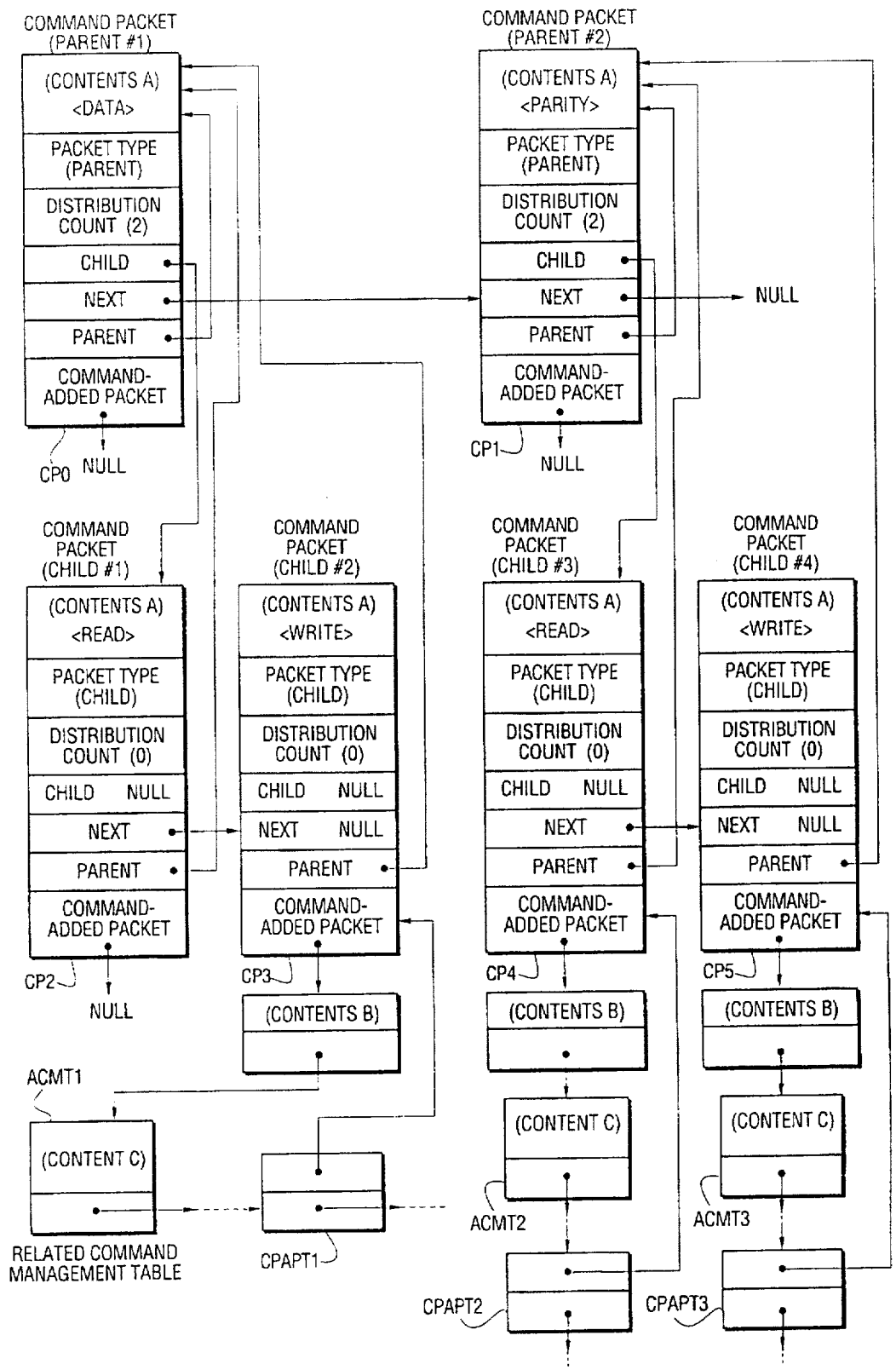
FIG. 12 is a view showing typical structures of command packets and a related command management table, and the relationship between the command packets, as well as the management table in connection with another embodiment of the invention.

On receiving a command packet for a write access request from the file access request management part 103, the disc array address translation means 10421 regards the packet as a parent command packet #1, as shown in FIG. 12. The disc array address translation means 10421 copies the parent command packet #1 in the memory 151 to create a parent command packet #2 therein. As illustrated, the parent command packets #1 and #2 are each furnished with a "NEXT" field allowing the two packets to be linked.

After this, the disc array address translation means 10421 creates under the parent command packet #1 a child command packet #1 for reading the old data and a child command packet #2 for writing the old data; the disc array address translation means 10421 also creates under the parent command packet #2 a child command packet #3 for reading the old parity data and a child command packet #4 for writing the old parity data. The four child command packets thus created are stored in the memory 151. The addresses of the four child command packets are handed over to the disc array command relation management means 10424.

The disc array command relation management means 10424 first references the command packet #1 for reading the old data, and checks to see if the old data exists in that area of the memory 151 which is managed by the ECC generation cache means 10425. If the old data is found to exist in the designated memory area, the disc array command relation management means 10424 sets a normal end to the "execution status" field of the child command packet #1 and sends an end notice to the disc address translation means 10421. The ECC calculation means 10423 references the command packet #4 for writing the new parity data, the packet #4 being linked via the parent packets #1 and #2 to the command packet #1 for reading the old data. In so doing, the ECC calculation means 10423 checks to see if any address is found in the "memory address" field of the command packet #4. If no address is found to exist in that "memory address" field, the ECC calculation means 10423 calculates the exclusive OR (i.e., difference data) of the old data and the new data designated by the command packet for writing the new data. The result of the calculation is stored in the memory 151 via the ECC generation cache means 10425, and the memory address used is entered into the "memory address" field of the command packet #4 for writing the new parity data.

If the old data is not found to exist in the designated area of the memory 151, the child command packet #1 is handed over to the disc command management means 1043 and passed on to the disc unit from which the old data is read. The disc array command relation management means 10424 then sets a normal end to the "execution status" field of the finished command packet for reading the old data, and sends an end notice to the disc address translation means 10421. As in the above example, The ECC calculation means 10423 references the command packet #4 for writing the new parity data, the packet #4 being linked via the parent packets #1 and #2 to the command packet #1 for reading the old data. In so doing, the ECC calculation means 10423 checks to see if any address is found in the "memory address" field of the command packet #4. If no address is found to exist in that "memory address" field, the ECC calculation means 10423 calculates the exclusive OR of the old data and the new data designated by the command packet for writing the new data. The result of the calculation is stored in the memory 151 via the ECC generation cache means 10425, and the memory address used is entered into the "memory address" field of the command packet #4 for writing the new parity data.

Next, the disc array command relation management means 10424 delivers to the disc command management means 1043 the command packet #2 for writing the new data. As with the fourth embodiment, the disc command management means 1043 relates the received command packet #2 to other write command packets before sending it to the disc unit. The subsequent processing is the same as that of the first embodiment. Upon completion of data transfer regarding all related command packets, the input/output unit issues a single interruption. Control is returned to the disc array command relation management means 10424. In turn, the disc array command relation management means 10424 sets a normal end to the "execution status" field of the finished command packet for writing the new data, and sends an end notice to the disc address translation means 10421. On receiving the end notice, the disc address translation means 10421 recognizes the end of the parent command packet #1, sets a normal end to the "execution status" field of the parent command packet #1, and sends an end notice to the file access request management part 103. In response, the file access request management part 103 sends an end notice to the user process 102, i.e., the source of the write access request.

In practice, parity data update has yet to be terminated at this point. It follows that the end notice is sent to the user process 102 before the parity data is updated.

The disc array command relation management means 10424 then references the child command packet #3 for reading the old parity data, and checks to see if the old parity data exists in that area of the memory 151 which is managed by the ECC generation cache means 10425. If the old parity data is found to exist in the designated memory area, the disc array command relation management means 10424 sets a normal end to the "execution status" field of the child command packet #3 and sends an end notice to the disc address translation means 10421. The ECC calculation means 10423 causes the ECC generation cache means 10425 to read the difference data between the old and new data from the address placed in the "memory address" field of the child command packet #4 for writing the new parity data, the packet #4 being linked via the parent command packet #2 to the child command packet #3 for reading the old parity data. The ECC calculation means 10423 exclusive-OR's the difference data and the acquired old parity data. The result of the calculation is written to that address in the memory 151 which is placed in the "memory address" field of the child command packet #4. The child command packet #4 is queued into the queuing means within the ECC generation cache means 10425.

If the ECC generation cache means 10425 does not hold the old parity data, the child command packets #3 and #4 for the old and new parity data are queued into the queuing means within the ECC generation cache means 10425.

Upon the elapse of an appropriate period of time, command packets are issued from the queuing means within the ECC generation cache means 10425. Specifically, the disc array command relation management means 10424 scans the queuing means of the ECC generation cache means 10425, relates only an appropriate number of child command packets #3 for reading the old parity data, and sends the child command packets #3 to the disc command management means 1043. The subsequent processing is the same as with the first embodiment. Upon completion of data transfer regarding all related command packets, the input/output unit issues a single interruption as with the first, second, third and fourth embodiments. Control is returned to the disc array command relation management means 10424. In response, the disc array command relation management means 10424 sets a normal end to the "execution status" field of the finished command packet for reading the old parity data, and sends an end notice to the disc address translation means 10421.

After the old parity read command packet #3 is normally terminated and the old parity data is acquired, the ECC calculation means 10423 gains the new parity data by use of the acquired old parity data. The disc array command relation management means 10424 relates within the queue a plurality of child command packets #4 by which the new parity data was acquired. The related child command packets for the new parity data are sent to the disc command management means 1043.

The subsequent processing is the same as with the first embodiment. Upon completion of data transfer regarding all related command packets, the input/output unit issues a single interruption as with the first, second, third and fourth embodiments. Control is returned to the disc array command relation management means 10424. In response, the disc array command relation management means 10424 sets a normal end to the "execution status" field of the finished command packet for writing the new parity data, and sends an end notice to the disc address translation means 10421.

With the end notices received for the four child command packets corresponding to one parent command packet, the disc address translation means 10421 sets a normal end to the "execution status" field of the parent command packet #2, as in the case of the second embodiment. Termination processing is then carried out. It should be noted that end notices were already sent to the file access management part 103 and user process 102, the latter being the source of the write access request, and that no further end notices will now be made thereto.

As described, the fifth embodiment makes disc access operation faster than ever by utilizing the ECC generation cache arrangement where parity data update is separated from, and performed later than, a data update. In so doing, the fifth embodiment drastically alleviate the burden on the CPU as a result of the reduced incidence of interrupt handling.

In the input/output unit 2 of any of the preceding embodiments of the invention, the related command end determination means 2031 does not send an end notice to the host computer 1 until all related commands have been terminated. This scheme can raise the possibility of postponing the end notice indefinitely if one of the related commands has developed an error. This potential snag may be circumvented by having the related command end determination means 2031 recognize a time-out upon elapse of a predetermined period of time. At the end of the predetermined time, the related command end determination means 2031 may issue an end notice regardless of the related commands being terminated or not.

On receiving the end notice, the disc command management part 104 of the host computer 1 verifies the status of the related commands. When detecting an unfinished command, the disc command management part 104 may either issue the command again or notify the source of the request that execution of the command has failed.

The preceding embodiments of the invention may be applied not only to magnetic disc units but also to optical disc units, semiconductor storage devices, magnetic tape units, communication controllers and other equipment involving input/output processing.

As described, the invention offers a computer system capable of reducing the number of times the CPU is interrupted upon disc access operation, whereby the burdens on the CPU are reduced appreciably.

While the present invention has been described in detail and pictorially in the accompanying drawings it is not limited to such details since many changes and modifications recognizable to those of ordinary skill in the art may be made to the invention without departing from the spirit and the scope thereof.

What is claimed is:

1. A computer system comprising:

a host machine having a memory and a CPU which includes interrupt handling feature;

an auxiliary memory unit for recording and reproducing data; and an input/output unit for permitting data input and output between said host machine and said auxiliary memory unit;

said CPU of said host machine includes:

means for generating a plurality of commands for designating access to said auxiliary memory unit, and relation means, responsive to at least one command, for grouping a plurality of said commands according to type for designating access to said auxiliary memory unit, into at least one group and for supplying said input/output unit with said commands independently of one another;

said input/output unit includes:

access execution means for executing access to said auxiliary memory unit as designated by each of the commands of one group of said at least one group supplied independently of one another by said CPU, and notification means for notifying said CPU by a single interruption that execution of the commands of said one group has been terminated when the accesses designated by all commands belonging to said one group are found to have been terminated.

2. A computer system according to claim 1, wherein said CPU further comprises:

means for storing in said memory information representing corresponding relations between each group of said at least one group and commands belonging to said each group.

3. A computer system according to claim 1, wherein said CPU further comprises:

means for attaching to each command of each group of said at least one group identification information identifying the group to which said each command belongs, said identification information being supplied to said input/output unit along with said each command.

4. A computer system according to claim 2, wherein said CPU further comprises:

termination means for referring to said information stored in said memory and said commands belonging to said one group when said CPU is notified by said single interruption from said input/output unit that processing of said one group has been terminated.

5. A computer system according to claim 3, wherein said input/output unit further comprises:

information generation and storage means for generating and storing information representing corresponding relations between each of said commands independently supplied from said relation means and said one group to which said command independently supplied from said relation means belongs based on said identification information attached to said commands independently supplied from said relation means.

6. A computer system according to claim 2, wherein said CPU further comprises:

means for attaching to each command of each group of said at least one group identification information identifying the group to which said each command belongs, said identification information being supplied to said input/output unit along with said commands.

7. A computer system according to claim 6, wherein said CPU further comprises:

termination means for referring to said information stored in said memory and said commands belonging to said one group when said CPU is notified by said single interruption from said input/output unit that processing of said one group has been terminated.

8. A computer system according to claim 7, wherein said input/output unit further comprises:

information generation and storage means for generating and storing information representing corresponding relations between each of said commands independently supplied from said relation means and said one group to which said commands independently supplied from said relation means belong based on said identification information attached to said commands independently supplied from said relation means.

9. A computer system according to claim 1, wherein said auxiliary memory unit is a disc array unit having a plurality of disc drives;

said CPU of said host machine further comprises:

command generation means for generating commands to the individual disc drives included within said disc array unit based on disc array commands for designating access to the disc arrays, and command correspondence storage means for storing in said memory corresponding relations between said disc array commands and said commands for said individual disc drives;

said relation means groups, into a single group, commands for individual disc drives corresponding to one of said disc array commands; and wherein said computer system further comprises:

termination means for appropriately terminating all commands belonging to said one group such that a disc array command in said memory which corresponds to the commands belonging to said one group is terminated.

10. A computer system according to claim 5, wherein said auxiliary memory unit is a disc array unit having a plurality of disc drives;

said CPU of said host machine further comprises:
command generation means for generating commands to the individual disc drives included within said disc array unit based on disc array commands for designating access to the disc array, and
command correspondence storage means for storing in said memory corresponding relations between said disc array commands and said commands for said individual disc drives;

said relation means groups, into a single group, commands for individual disc drives corresponding to one of said disc array commands; and wherein said computer system further comprises:
termination means for terminating appropriately all commands belonging to said one group such that a disc array command in said memory which corresponds to the commands belonging to said one group is terminated.

11. A computer system according to claim 5, wherein said auxiliary memory unit is a disc array unit having a plurality of disc drives;

said CPU of said host machine further comprises:
command generation means for generating commands to the individual disc drives included within said disc array unit based on disc array commands for designating access to the disc arrays, and
command correspondence storage means for storing in said memory corresponding relations between said disc array commands and said commands for said individual disc drives;

said relation means groups, into a single group, commands for individual disc drives corresponding to one of said disc array commands; and wherein said computer system further comprises:
termination means for terminating appropriately all command belonging to said one group such that a disc array command in said memory which corresponds to the commands belonging to said one group is terminated.

12. A computer system according to claim 11, wherein said auxiliary memory unit is a disc array unit having a plurality of disc drives;

said CPU of said host machine further comprises:
command generation means for generating commands to the individual disc drives included within said disc array unit based on disc array commands for designating access to the disc arrays, and
command correspondence storage means for storing in said memory corresponding relations between said disc array commands and said commands for said individual disc drives;

said relation means groups, into a single group, commands for individual disc drives corresponding to one of said disc array commands; and wherein said computer system further comprises:
termination means for terminating appropriately all commands belonging to said one group such that a disc array command in said memory which corresponds to the commands belonging to said one group is terminated.

13. A computer system according to claim 5, wherein said auxiliary memory unit is a disc array unit made of a plurality of disc drives;

said CPU of said host machine further comprises:
command generation means for generating commands to the individual disc drives includes within said disc array unit based on disc array commands for designating access to the disc arrays, and
command correspondence storage means for storing in said memory corresponding relations between said disc array commands and said commands for said individual disc drives;

said relation means groups, into a single group, commands for individual disc drives corresponding to one of said disc array commands; and wherein said computer system further comprises:
termination means for terminating appropriately all commands belonging to said one group such that a disc array command in said memory which corresponds to the commands belonging to said one group is terminated.

14. A computer system according to claim 5, wherein said auxiliary memory unit is a disc array unit having a plurality of disc drives;

said CPU of said host machine further comprises:
command generation means for generating commands to the individual disc drives included within said disc array unit based on disc array commands for designating access to the disc arrays, and
command correspondence storage means for storing in said memory corresponding relations between said disc array commands and said commands for said individual disc drives;

said relation means groups, into a single group, commands for individual disc drives corresponding to one of said disc array commands; and wherein said computer system further comprises:
termination means for terminating appropriately all commands belonging to said one group such that a disc array command in said memory which corresponds to the commands belonging to said one group is terminated.

15. A computer system according to claim 14, wherein said auxiliary memory unit is a disc array unit having a plurality of disc drives;

said CPU of host machine further comprises:
command generation means for generating commands to the individual disc drives included within said disc array unit based on disc array commands for designating access to the disc arrays, and
command correspondence storage means for storing in said memory corresponding relations between said disc array commands and said commands for said individual disc drives;

said relation means groups, into a single group, commands for individual disc drives corresponding to one of said disc array commands; and wherein said computer system further comprises:
termination means for terminating appropriately all commands belonging to said one group such that a disc array command in said memory which corresponds to the commands belonging to said one group is terminated.

16. A computer system according to claim 8, wherein said auxiliary memory unit is a disc array unit having a plurality of disc drives;

said CPU of said host machine further comprises:
  command generation means for generating commands to the individual disc drives included within said disc array unit based on disc array commands for designating access to the disc arrays, and
  command correspondence storage means for storing in said memory corresponding relations between said disc array commands and said commands for said individual disc drives:
said relation means groups, into a single group, commands for individual disc drives corresponding to one of said disc array commands; and
wherein said computer system further comprises:
  termination means for terminating appropriately all commands belonging to said one group such that a disc array command in said memory which corresponds to the commands belonging to said one group is terminated.

17. An input/output unit for permitting data input and output between a host machine and an auxiliary memory unit, comprising:
  information generation means for generating information representing corresponding relations between each of a plurality of commands supplied from said host machine and a group to which said command belongs based on identification information for identifying the group to which said command belongs, said identification information being attached to said commands supplied from said host machine to said input/output unit;
  access execution means for executing access to said auxiliary memory unit as designated by each of said commands supplied from said host machine to said input/output unit included in one group; and
  notification means for notifying said CPU by a single interruption that processing of said one group has been terminated when accesses designated by all commands belonging to said one group have been terminated.

18. An input/output unit for permitting data input and output between a host machine and an auxiliary memory unit, comprising:
  access execution means for executing access to said auxiliary memory unit as designated by commands supplied from said host machine to said input/output unit, the commands being grouped into at least one group; and
  notification means for notifying said host machine by a single interruption that processing of one group of said at least one group has been terminated when accesses designated by all commands belonging to said one have been terminated based on corresponding relation between said one group and commands belonging to said one group.

19. An access method for use in a computer system including a host machine having a memory and a CPU with an interrupt handling feature; an auxiliary memory unit for recording and reproducing data, and an input/output unit for permitting data input and output between said host machine and said auxiliary memory unit, said access method comprising the steps of:
  generating a plurality of commands for designating access to said auxiliary unit;
  in response to at least one command, grouping a plurality of said commands for designating access to said auxiliary memory unit, into at least one group;
  supplying said input/output unit with said commands independently of one another;
  executing access to said auxiliary memory unit as designated by each of the commands of one group of said at least one group supplied independently of one another; and
  notifying said CPU by a single interruption that execution of the commands of said one group have been terminated when the accesses designated by all commands belonging to said one group have been terminated.

20. An access method according to claim 19, further comprising the step of:
  storing in said memory information representing corresponding relations between each group of said at least one group and commands belonging to said each group.

21. An access method according to claim 19, further comprising the step of:
  attaching to each command of each group identification information identifying the group to which said each command belongs, said identification information being supplied to said input/output unit along with said commands.

22. An access method according to claim 20, further comprising the step of:
  referring to said information stored in said memory and said commands belonging to said one group when said CPU is notified by said single interruption from said input/output unit that processing of said one group has been terminated.

23. An access method according to claim 21, further comprising the step of:
  generating and storing information representing corresponding relations between each of said commands independently supplied to said input/output unit and said one group to which said commands independently supplied to said input/output unit belongs based on said identification information attached to said commands independently supplied to said input/output unit.

24. A computer system comprising:
  a host machine having a memory and a CPU with an interrupt handling facility;
  an auxiliary memory unit for recording and reproducing data; and an input/output unit for allowing data to be exchanged between said host machine and said auxiliary memory unit,
  wherein said CPU of said host machine includes:
    a means for generating a plurality of independent commands each requesting an access to said auxiliary memory unit, and
    a relation setting means for setting a relation between at least one of said commands and a group composed of at least one of said commands each requesting an access to said auxiliary memory unit so as to allow an end report of said group to be received as a single interrupt, and for issuing at least one of said commands related to groups independently of each other to said input/output unit without regard to groups to which said commands pertain, and
  said input/output unit includes:
    an access execution means for making accesses to said auxiliary memory unit as requested by said commands issued by said CPU independently of each other for requesting said accesses to said auxiliary memory unit concurrently at the same time by determining an execution order of said commands without regard to groups to which said commands pertain; and
    a notification means which is used for terminating a group and notifying said CPU by a single interrupt that said group has been terminated when an end of execution of all commands pertains to said group is identified.

25. A computer system according to claim 24 wherein said CPU further comprises an information storing means for storing information on relations between at least one group, which is created so as to allow an end report of each of said group to be received by said CPU as a single interrupt, and at least one of commands composing said group.

26. A computer system according to claim 24 wherein:

said CPU further comprises a means for attaching identification information for identifying a group to each of commands constituting said group created so as to allow an end report of said group to be received by said CPU as a single interrupt with which said commands are associated; and each of said commands is issued to said input/output unit along with said identification information.

27. A computer system according to claim 25 wherein said CPU further comprises a termination processing of all commands pertaining to a group by referring to information on a relation between said group and said commands stored in a host memory when said CPU recognizes an end of processing of said group from a single interrupt generated by said input/output unit.

28. A computer system according to claim 26 wherein said input/output unit comprises information generating/storing means for generating and storing a relation between a plurality of commands issued independently of each other by said relation setting means of said CPU and a group to which said commands pertain with said relation based on identification information attached to each of said commands, allowing a plurality of commands pertaining to a plurality of groups to be received independently of each other at the same time.

29. A computer system according to claim 25, wherein said CPU further comprises:

means for attaching to each command of each group of said at least one group identification information identifying the group to which said each command belongs, said identification information being supplied to said input/output unit along with said commands.

30. A computer system according to claim 29, wherein said CPU further comprises:

termination means for referring to said information stored in said memory and said commands belonging to said one group when said CPU is notified by said single interruption from said input/output unit that processing of said one group has been terminated.

31. A computer system according to claim 30, wherein said input/output unit further comprises:

information generation and storage means for generating and storing information representing corresponding relations between each of said commands independently supplied from said relation means and said one group to which said commands independently supplied from said relation means belong based on said identification information attached to said command independently supplied from said relation means.

32. A computer system according to claim 24, wherein said auxiliary memory unit is a disc array unit having a plurality of disc drives;

said CPU of said host machine further comprises:
command generation means for generating commands to the individual disc drives included within said disc array unit based on disc array commands for designating access to the disc arrays, and command correspondence storage means for storing in said memory corresponding relations between said disc array commands and said commands for said individual disc drives;

said relation means groups, into a single group, commands for individual disc drives corresponding to one of said disc array commands; and wherein said computer system further comprises:
termination means for appropriately terminating all commands belonging to said one group such that a disc array command in said memory which corresponds to the commands belonging to said one group is terminated.

33. A computer system according to claim 28, wherein said auxiliary memory unit is a disc array unit having a plurality of disc drives;

said CPU of said host machine further comprises:
command generation means for generating commands to the individual disc drives included within said disc array unit based on disc array commands for designating access to the disc array, and command correspondence storage means for storing in said memory corresponding relations between said disc array commands and said commands for said individual disc drives;

said relation means groups, into a single group, commands for individual disc drives corresponding to one of said disc array commands; and wherein said computer system further comprises:
termination means for terminating appropriately all commands belonging to said one group such that a disc array command in said memory which corresponds to the commands belonging to said one group is terminated.

34. A computer system according to claim 28, wherein said auxiliary memory unit is a disc array unit having a plurality of disc drives;

said CPU of said host machine further comprises:
command generation means for generating commands to the individual disc drives included within said disc array unit based on disc array commands for designating access to the disc arrays, and command correspondence storage means for storing in said memory corresponding relations between said disc array commands and said commands for said individual disc drives;

said relation means groups, into a single group, commands for individual disc drives corresponding to one of said disc array commands; and wherein said computer system further comprises:
termination means for terminating appropriately all command belonging to said one group such that a disc array command in said memory which corresponds to the commands belonging to said one group is terminated.

35. A computer system according to claim 34, wherein said auxiliary memory unit is a disc array unit having a plurality of disc drives;

said CPU of said host machine further comprises:
command generation means for generating commands to the individual disc drives included within said disc array unit based on disc array commands for designating access to the disc arrays, and command correspondence storage means for storing in said memory corresponding relations between said disc array commands and said commands for said individual disc drives;

said relation means groups, into a single group, commands for individual disc drives corresponding to one of said disc array commands; and wherein said computer system further comprises:

termination means for terminating appropriately all commands belonging to said one group such that a disc array command in said memory which corresponds to the commands belonging to said one group is terminated.

36. A computer system according to claim 28, wherein said auxiliary memory unit is a disc array unit made of a plurality of disc drives;

said CPU of said host machine further comprises:

command generation means for generating commands to the individual disc drives includes within said disc array unit based on disc array commands for designating access to the disc arrays, and command correspondence storage means for storing in said memory corresponding relations between said disc array commands and said commands for said individual disc drives;

said relation means groups, into a single group, commands for individual disc drives corresponding to one of said disc array commands; and wherein said computer system further comprises:

termination means for terminating appropriately all commands belonging to said one group such that a disc array command in said memory which corresponds to the commands belonging to said one group is terminated.

37. A computer system according to claim 28, wherein said auxiliary memory unit is a disc array unit having a plurality of disc drives;

said CPU of said host machine further comprises:

command generation means for generating commands to the individual disc drives included within said disc array unit based on disc array commands for designating access to the disc arrays, and command correspondence storage means for storing in said memory corresponding relations between said disc array commands and said commands for said individual disc drives;

said relation means groups, into a single group, commands for individual disc drives corresponding to one of said disc array commands; and wherein said computer system further comprises:

termination means for terminating appropriately all commands belonging to said one group such that a disc array command in said memory which corresponds to the commands belonging to said one group is terminated.

38. A computer system according to claim 37, wherein said auxiliary memory unit is a disc array unit having a plurality of disc drives;

said CPU of host machine further comprises:

command generation means for generating commands to the individual disc drives included within said disc array unit based on disc array commands for designating access to the disc arrays, and command correspondence storage means for storing in said memory corresponding relations between said disc array commands and said commands for said individual disc drives;

said relation means groups, into a single group, commands for individual disc drives corresponding to one of said disc array commands; and wherein said computer system further comprises:

termination means for terminating appropriately all commands belonging to said one group such that a disc array command in said memory which corresponds to the commands belonging to said one group is terminated.

39. A computer system according to claim 31, wherein said auxiliary memory unit is a disc array unit having a plurality of disc drives;

said CPU of said host machine further comprises:

command generation means for generating commands to the individual disc drives included within said disc array unit based on disc array commands for designating access to the disc arrays, and command correspondence storage means for storing in said memory corresponding relations between said disc array commands and said commands for said individual disc drives:

said relation means groups, into a single group, commands for individual disc drives corresponding to one of said disc array commands; and wherein said computer system further comprises:

termination means for terminating appropriately all commands belonging to said one group such that a disc array command in said memory which corresponds to the commands belonging to said one group is terminated.

40. A computer system comprising:

a host machine having a memory and a CPU which includes interrupt handling feature;

an auxiliary memory unit for recording and reproducing data; and an input/output unit for permitting data input and output between said host machine and said auxiliary memory unit;

said CPU of said host machine including:

means for generating a plurality of commands for designating access to said auxiliary unit, relation means, responsive to at least one command, for grouping a plurality of said commands for designating access to said auxiliary memory unit, into at least one group and for supplying said input/output unit with said commands independently of one another, command generation means, respective to a disc array command for designating access to the disc array unit for writing new data thereto, for generating a new data write command for designating access to said data disc drives for writing new data thereto, a current data read command for designating access to said data disc drives for reading current data therefrom, said current data being updated by access to said data disc drives to write new data thereto, a current parity read command for designating access to said at least one parity disc drive for reading current parity data therefrom, said current parity data corresponding to data in said data disc drives which is updated by access to said data disc drives for writing new data thereto, and a new parity write command for designating access to said parity disc drive for writing new parity data thereto, and new parity data corresponding to said new data which is updated by access to said data disc drives for writing new data thereto, and a parity generation unit for generating new parity data, said relation means grouping said current data read command and said current parity read command into a single group and supplying as a first group said current data read command and said current parity read command to said input/output unit, thereafter grouping into a single group said new data write command and said new parity write command when said parity generation unit generates new parity data to be written by use of said new parity write command and supplying as a second group said new data write command and said new parity write command to said input/output unit;

said parity generation unit exclusive-OR'ing said current data, said current parity data and said new data, said current data being read from said disc array unit by use of the supplied current data read command, said current parity data being read from said disc array unit by use of the supplied current parity read command, said new data being written by use of said new data write command, and a result of said exclusive-OR'ing being generated as new parity data to be written by use of said new parity write command;

said input/output unit includes:
access execution means for executing access to said auxiliary memory unit as designated by each of the commands of one group of said at least one group supplied independently of one another by said CPU, and notification means for notifying said CPU by the single interruption that execution of the commands of said one group has been terminated when the accesses designated by all commands belonging to said one group are found to have been terminated;

wherein said auxiliary memory unit is a RAID type disc array unit which includes a plurality of data disc drives for storing data, and at least one parity disc drive for storing parity data related to data stored at the same disc addresses in a plurality of data disc drives.

41. A computer system according to claim 40, wherein said memory stores information representing a corresponding relation among the first group made of said current data read command and said current parity read command, the second group made of said new data write command and said new parity write command, and the disc array commands corresponding to the first and second groups: and said computer system further comprises:
termination means for checking whether said input/output unit has already notified termination of said first and second groups stored in said memory with respect to the disc array command which in turn is stored in said memory with respect to said one group and terminating said disc array command if the notification has already been made.

42. A computer system comprising:
a host machine having a memory and a CPU which includes an interrupt handling feature;
an auxiliary memory unit for recording and reproducing data; and
an input/output unit for permitting data input and output between said host machine and said auxiliary memory unit;
said CPU of said host machine including:
means for generating a plurality of commands for designating access to said auxiliary unit,
relation means, responsive to at least one command, for grouping a plurality of said commands for designating access to said auxiliary memory unit, into at least one group and for supplying said input/output unit with said commands independently of one another,
data write means for temporarily writing to a cache area in said memory data to be written to said auxiliary memory, and
a write-back request unit for generating at an appropriate timing a plurality of commands for designating access to said auxiliary memory unit for writing thereto a plurality of data items previously written in said cache area;
said relation means grouping into a single group at least part of the commands generated by said write-back request unit at said appropriate timing; and said input/output unit includes:
access execution means for executing access to said auxiliary memory unit as designated by each of the commands of one group of said at least one group supplied independently of one another by said CPU, and notification means for notifying said CPU by the single interruption that execution of the commands of said one group has been terminated when the accesses designated by all commands belonging to said one group are found to have been terminated.

43. A computer system according to claim 42, wherein said write-back request unit attaches, when a predetermined condition is met, information for inhibiting command grouping to the commands for designating access to said auxiliary memory unit for writing thereto data items written previously in said cache area;

said relation means setting aside from the commands generated by said write-back request unit at said appropriate timing commands furnished with information for inhibiting command grouping so as to refrain from grouping commands furnished with information for inhibiting grouping into any group.

44. A computer system comprising:
a host machine having a memory and a CPU which has an interrupt handling feature;
an auxiliary memory unit for recording and reproducing data; and
an input/output unit for permitting data input and output between said host machine and said auxiliary memory unit;
said CPU of said host machine including:
means for generating a plurality of commands for designating access to said auxiliary unit,
relation means, responsive to at least one command, for grouping a plurality of said commands for designating access to said auxiliary memory unit, into at least one group and for supplying said input/output unit with said commands independently of one another,
command generation means, responsive to a disc array command for designating access to the disc array unit for writing new data thereto, for generating a new data write command for designating access to said data disc drives for writing new data thereto, a current data read command for designating access to said data disc drives for reading current data therefrom, said current data being updated by access to said data disc drives for writing new data thereto, a current parity read command for designating access to said at least one parity disc drive for reading current parity data therefrom, said current parity data corresponding to that data in said data disc drives which is updated by the access to said data disc drives for writing new data thereto, and a new parity write command for designating access to said at least one parity disc drive for writing new parity data thereto, said new parity data corresponding to said new data which is updated by access to said data disc drives for writing new data thereto, and a parity generation unit for generating new parity data,
  said relation means supplies said current data read command to said input/output unit, supplies a current data write command to said input/output unit when said input/output unit has read current data from said disc arrays, thereafter groups into a single group a plurality of current parity read commands upon elapse of a predetermined period of time, supplies to said input/output unit said single group of current parity read commands, groups into a single group a plurality of new parity write commands for writing the new parity data generated by said parity generation unit, and supplies to said input/output unit said single group of new parity write commands,
  said parity generation unit including exclusive-OR calculation means for exclusive-OR'ing the current data and new data, said current data being read from said disc array unit by said input/output unit in accordance with the supplied current data read commands, said new data being written by said input/output unit in accordance with said new data write command; exclusive-OR holding means for holding a result of said exclusive-OR'ing; and new parity generation means for exclusive-OR'ing current and held parity data, said current parity data being read from said disc array unit in accordance with said current parity read commands, said new parity generation means further generating as new parity data a result of the exclusive-OR'ing of said current and said held parity data; and
  said input/output unit including access execution means for executing access to said auxiliary memory unit as designated by each of the commands of one group of said at least one group supplied independently of one another by said CPU, and notification means for notifying said CPU by the single interruption that execution of the commands of said one group has been terminated when the accesses designated by all commands belonging to said one group are found to have been terminated,
  wherein said auxiliary memory unit is a RAID type disc array unit which includes a plurality of data disc drives for storing data, and at least one parity disc drive for storing parity data related to data stored at the same disc addresses in a plurality of said data disc drives.

45. A computer system according to claim 44, wherein said CPU of said host machine further comprises holding means for holding, in a cache area in said memory, the data and parity data read from said disc array unit;
  said relation means refraining from supplying a current data read command to said input/output unit when there exists in said cache area data corresponding to data to be read by said current data read command, said relation means further refraining from supplying a current parity read command to said input/output unit when there exists in said cache area parity data corresponding to parity data to be read by said current parity read command;
  said parity generation unit, when there exists in said cache area data corresponding to data to be read by use of said current data read command, generates an exclusive-OR of new data and data residing in said cache area, said data in said cache area taking the place of said current data read from said disc arrays; said parity generation unit further, when there exists in said cache area parity data corresponding to parity data to be read by use of said current data read command, generates an exclusive-OR of the current and held parity data, said parity data in said cache area taking the place of said current parity data read from said disc arrays, said exclusive-OR of said current and said held parity data being written by use of said new parity write command.

46. A computer system comprising:
  a host machine having a memory and a CPU which includes interrupt handling feature;
  an auxiliary memory unit for recording and reproducing data; and
  an input/output unit for permitting data input and output between said host machine and said auxiliary memory unit;
  said CPU of said host machine includes:
    means for generating a plurality of commands for designating access to said auxiliary unit,
    relation means, responsive to at least one command, for grouping a plurality of said commands for designating access to said auxiliary memory unit, into at least one group and for supplying said input/output unit with said commands independently of one another,
    means for storing in said memory information representing corresponding relations between each group of said at least one group and commands belonging to said each group,
    means for attaching to each command of each group of said at least one group identification information identifying the group to which said each command belongs, said identification information being supplied to said input/output unit along with said commands, and
    termination means for referring to said information stored in said memory and said commands belonging to said one group when said CPU is notified by said single interruption from said input/output unit that processing of said one group has been terminated,
    command generation means, responsive to a disc array command for designating access to the disc array unit for writing new data thereto, for generating a new data write command for designating access to said data disc drives for writing new data thereto, a current data read command for designating access to said data disc drives for reading current data therefrom, said current data being updated by access to said data disc drives to write new data thereto, a current parity read command for designating access to said at least one parity disc drive for reading current parity data therefrom, said current parity data corresponding to data in said data disc drives which is updated by access to said data disc drives for writing new data thereto, and a new parity write command for designating access to said parity disc drive for writing new parity data thereto, said new parity data corresponding to said new data which is updated by access to said data disc drives for writing new data thereto, and
  a parity generation unit for generating new parity data,
    said relation means grouping said current data read command and said current parity read command into a single group and supplying as a first group said current data read command and said current parity read command to said input/output unit, thereafter grouping into a single group said new data write command and said new parity write command when said parity generation unit generates new parity data to be written by use of said new parity write command and supplying as a second group said new data write command and said new parity write command to said input/output unit, and said parity generation unit exclusive-OR'ing said current data, said current parity data and said new data, said current data being read from said disc array unit by use of the supplied current data read command, said current parity data being read from said disc array unit by use of the supplied current parity read command, said new data being written by use of said new data write command, and a result of said exclusive-OR'ing being generated as new parity data to be written by use of said new parity write command; and said input/output unit includes:
access execution means for executing access to said auxiliary memory unit as designated by each of the commands of one group of said at least one group supplied independently of one another by said CPU,
notification means for notifying said CPU by the single interruption that execution of the commands of said one group has been terminated when the accesses designated by all commands belonging to said one group are found to have been terminated, and
information generation and storage means for generating and storing information representing corresponding relations between each of said commands independently supplied from said relation means and said one group to which said commands independently supplied from said relation means belongs based on said identification information attached to said commands independently supplied from said relation means;

wherein said auxiliary memory unit is a RAID type disc array unit which includes a plurality of data disc drives for storing data, and at least one parity disc drive for storing parity data related to data stored at the same disc addresses in a plurality of data disc drives.

47. A computer system according to claim 46, wherein
said memory stores information representing a corresponding relation among the first made of said current data read command and said current parity read command, the second group made of said new data write command and said parity write command, and the disc array commands corresponding to the first and second groups; and
said computer system further comprises termination means for checking whether said input/output unit has already notified termination of said first and second groups stored in said memory with respect to the disc array command which in turn is stored in said memory with respect to said one group and termination said disc array command if the notification has already been made.

48. A computer system comprising:
a host machine having a memory and a CPU which includes interrupt handling feature;
an auxiliary memory unit for recording and reproducing data; and an input/output unit for permitting data input and output between said host machine and said auxiliary memory unit;
said CPU of said host machine including:
means for generating a plurality of commands for designating access to said auxiliary unit,
relation means, responsive to at least one command, for grouping a plurality of said commands for designating access to said auxiliary memory unit, into at least one group and for supplying said input/output unit with said commands independently of one another,
means for storing in said memory information representing corresponding relations between each group of said at least one group and commands belonging to said each group,
means for attaching to each command of each group of said at least one group identification information identifying the group to which said each command belongs, said identification information being supplied to said input/output unit along with said commands,
termination means for referring to said information stored in said memory and said commands belonging to said one group when said CPU is notified by said single interruption from said input/output unit that processing of said one group has been terminated,
data write means for temporarily writing to a cache area in said memory data to be written to said auxiliary memory unit, and
a write-back request unit for generating at an appropriate timing a plurality of commands for designating access to said auxiliary memory unit for writing thereto a plurality of data items previously written in said cache area,
said relation means grouping into a single group at least part of the commands generated by said write-back request unit at said appropriate timing; and
said input/output unit includes:
access execution means for executing access to said auxiliary memory unit as designated by each of the commands of one group of said at least one group supplied independently of one another by said CPU,
notification means for notifying said CPU by the single interruption that execution of the commands of said one group has been terminated when the accesses designated by all commands belonging to said one group are found to have been terminated, and
information generation and storage means for generating and storing information representing corresponding relations between each of said commands independently supplied from said relation means and said one group to which said commands independently supplied from said relation means belongs based on said identification information attached to said commands independently supplied from said relation means.

49. A computer system according to claim 48, wherein said write-back request unit attaches, when a predetermined condition is met, information for inhibiting command grouping to the commands for designating access to said auxiliary memory unit for writing thereto data items written previously in said cache area; and said relation means sets aside from the commands generated by said write-back request unit at said appropriate timing commands furnished with information for inhibiting command grouping so as to refrain from grouping commands furnished with information for inhibiting grouping into any group.

50. A computer system comprising:
a host machine having a memory and a CPU which includes interrupt handling feature;
an auxiliary memory unit for recording and reproducing data; and
an input/output unit for permitting data input and output between said host machine and said auxiliary memory unit;
said CPU of said host machine including:
  means for generating a plurality of commands for designating access to said auxiliary unit,
  relation means, responsive to at least one command, for grouping a plurality of said commands for designating access to said auxiliary memory unit, into at least one group and for supplying said input/output unit with said commands independently of one another,
  means for storing in said memory information representing corresponding relations between each group of said at least one group and commands belonging to said each group,
  means for attaching to each command of each group of said at least one group identification information identifying the group to which said each command belongs, said identification information being supplied to said input/output unit along with said commands,
  termination means for referring to said information stored in said memory and said commands belonging to said one group when said CPU is notified by said single interruption from said input/output unit that processing of said one group has been terminated,
  command generation means, responsive to a disc array command for designating access to the disc array unit for writing new data thereto, for generating a new data write command for designating access to said data disc drives for writing new data thereto, a current data read command for designating access to said data disc drives for reading current data therefrom, said current data being updated by access to said data disc drives for writing new data thereto, a current parity read command for designating access to said at least one parity disc drive for reading current parity data therefrom, said current parity data corresponding to that data in said data disc drives which is updated by the access to said data disc drives for writing new data thereto, and a new parity write command for designating access to said at least one parity disc drive for writing new parity data thereto, said new parity data corresponding to said new data which is updated by access to said data disc drives for writing new data thereto, and
  a parity generation unit for generating new parity data,
    said relation means supplies said current data read command to said input/output unit, supplies a current data write command to said input/output unit when said input/output unit has read current data from said disc arrays, thereafter groups into a single group a plurality of current parity read commands upon elapse of a predetermined period of time, supplies to said input/output unit said single group of current parity read commands, groups into a single group a plurality of new parity write commands for writing the new parity data generated by said parity generation unit, and supplies to said input/output unit said single group of new parity write commands,
    said parity generation unit including exclusive-OR calculation means for exclusive-OR'ing the current data and new data, said current data being read from said disc array unit by said input/output unit in accordance with the supplied current data read commands, said new data being written by said input/output unit in accordance with said new data write command; exclusive-OR holding means for holding a result of said exclusive-OR'ing; and new parity generation means for exclusive-OR'ing current and held parity data, said current parity data being read from said disc array unit in accordance with said current parity read commands, said new parity generation means further generating as new parity data a result of the exclusive-OR'ing of said current and said held parity data;
said input/output unit includes:
  access execution means for executing access to said auxiliary memory unit as designated by each of the commands of one group of said at least one group supplied independently of one another by said CPU,
  notification means for notifying said CPU by the single interruption that execution of the commands of said one group has been terminated when the accesses designated by all commands belonging to said one group are found to have been terminated, and
  information generation and storage means for generating and storing information representing corresponding relations between each of said commands independently supplied from said relation means and said one group to which said commands independently supplied from said relation means belongs based on said identification information attached to said commands independently supplied from said relation means;
wherein said auxiliary memory unit is a RAID type disc array unit which includes a plurality of data disc drives for storing data, and at least one parity disc drive for storing parity data related to data stored at the same disc addresses in a plurality of said data disc drives.

51. A computer system according to claim 50, wherein said CPU of said host machine further comprises holding means for holding, in a cache area in said memory, the data and parity data read from said disc array unit;
said relation means refrains from supplying a current data read command to said input/output unit when there exists in said cache area data corresponding to data to be read by said current data read command, said relation means further refraining from supplying a current parity read command to said input/output unit when there exists in said cache area parity data corresponding to parity data to be read by said current parity read command; and
said parity generation unit, when there exists in said cache area data corresponding to data to be read by use of said current data read command, generates an exclusive-OR of new data and data residing in said cache area, said data in said cache area taking the place of said current data read from said disc array; said parity generation unit further, and, when there exists in said cache area parity data corresponding to parity data to be read by use of said current data read command, generates an exclusive-OR of the current and held parity data, said parity data in said cache area taking the place of said current parity data read from said disc arrays, said exclusive-OR of said current and said held parity data being written by use of said new parity write command.

* * * * *